United States Patent
Liu et al.

(10) Patent No.: US 12,144,275 B2
(45) Date of Patent: Nov. 19, 2024

(54) METHODS, APPARATUS, AND ARTICLES OF MANUFACTURE TO GENERATE A TURN PATH FOR A VEHICLE

(71) Applicant: Deere & Company, Moline, IL (US)

(72) Inventors: Qiang R. Liu, Urbandale, IA (US); Jeffrey E. Runde, Cedar Falls, IA (US); Simon Schaefer, Des Moines, IA (US)

(73) Assignee: Deere & Company, Moline, IL (US)

( * ) Notice: Subject to any disclaimer, the term of this patent is extended or adjusted under 35 U.S.C. 154(b) by 163 days.

(21) Appl. No.: 17/463,242

(22) Filed: Aug. 31, 2021

(65) Prior Publication Data

US 2023/0065712 A1    Mar. 2, 2023

(51) Int. Cl.
*A01B 69/04* (2006.01)
*G05D 1/00* (2024.01)

(52) U.S. Cl.
CPC ......... *A01B 69/008* (2013.01); *G05D 1/0016* (2013.01); *G05D 1/0219* (2013.01)

(58) Field of Classification Search
CPC .. A01B 69/008; G05D 1/0016; G05D 1/0219; G05D 2201/0201; G05D 1/0212; G05D 1/0278; A01D 41/1278
See application file for complete search history.

(56) References Cited

U.S. PATENT DOCUMENTS

| | | | |
|---|---|---|---|
| 8,214,111 B2 | 7/2012 | Heiniger et al. | |
| 8,954,216 B2 | 2/2015 | Yazaki et al. | |
| 9,266,611 B2 | 2/2016 | Rambo | |
| 10,194,575 B2 | 2/2019 | Schmidt | |
| 10,266,201 B2 | 4/2019 | Dang et al. | |
| 2016/0057921 A1* | 3/2016 | Pickett | A01B 69/008 701/41 |
| 2017/0102702 A1* | 4/2017 | Ishijima | A01D 34/008 |
| 2017/0144702 A1 | 5/2017 | Dang et al. | |
| 2018/0373256 A1 | 12/2018 | Runde et al. | |
| 2020/0084955 A1 | 3/2020 | Kreider et al. | |

(Continued)

FOREIGN PATENT DOCUMENTS

| | | |
|---|---|---|
| EP | 2020169 A2 | 2/2009 |
| EP | 1916584 B1 | 10/2012 |

(Continued)

OTHER PUBLICATIONS

Bergermann et al., Results with Autonomous Vehicles Operating in Specialty Crops, 2012 IEEE International Conference on Robotics and Automation, RiverCentre, Saint Paul, Minnesota, USA, May 14-18, 2012, pp. 1829-1835.

(Continued)

*Primary Examiner* — Anne Marie Antonucci
*Assistant Examiner* — Patrick Daniel Mohl
(74) *Attorney, Agent, or Firm* — Hanley, Flight & Zimmerman, LLC

(57) ABSTRACT

Methods, apparatus, and articles of manufacture to generate a turn path for a vehicle are disclosed. An example apparatus disclosed herein includes input interface circuitry to obtain a guidance path for a vehicle, turn identification circuitry to identify a turn in the guidance path, and turn pattern selection circuitry to select, from a plurality of predetermined (Continued)

turn patterns, a turn pattern for the turn, wherein the turn pattern satisfies a condition.

20 Claims, 19 Drawing Sheets

(56) References Cited

U.S. PATENT DOCUMENTS

| | | | |
|---|---|---|---|
| 2020/0296878 A1* | 9/2020 | Dix | A01B 69/008 |
| 2021/0078634 A1* | 3/2021 | Jalalmaab | B62D 13/06 |
| 2021/0339768 A1* | 11/2021 | Kakkar | A01B 79/005 |
| 2021/0405644 A1* | 12/2021 | Berridge | A01B 69/008 |
| 2022/0287218 A1* | 9/2022 | Yuasa | A01B 69/008 |
| 2022/0400600 A1* | 12/2022 | Mollick | A01B 79/005 |

FOREIGN PATENT DOCUMENTS

| | | | |
|---|---|---|---|
| EP | 2583544 A1 | | 4/2013 |
| EP | 3170381 A1 | | 5/2017 |
| WO | WO-2023012811 A1 | * | 2/2023 |

OTHER PUBLICATIONS

Cariou et al., Maneuvers automation for agricultural vehicle in headland, AgEng 2010, International Conference on Agricultural Engineering, Sep. 2010, Clermont-Ferrand, France, pp. 1-10.

Cariou et al., Motion planner and lateral-longitudinal controllers for autonomous maneuvers of a farm vehicle in headland, The 2009 IEEE/RSJ International Conference on Intelligent Robots and Systems Oct. 11-15, 2009 St. Louis, USA, pp. 5782-5787.

T. Oksanen et al., Path Planning Algorithms for agricultural field machines, Helsinki University of Technology Automation Technology Laboratory, Series A: Research Reports No. 31, Dec. 14, 2007, ISBN: 978-951-22-9080-2, pp. 1-110.

M. Kise et al., Enhancement of Turning Accuracy by Path Planning for Robot Tractor, Proceedings of the 2002 Automation Technology for Off-Road Equipment Conference Chicago, Illinois, USA, pp. 398-404.

Extended European Search Report and Written Opinion issued in European Patent Application No. 22188001.6, dated Jan. 30, 2023, in 10 pages.

* cited by examiner

METHODS, APPARATUS, AND ARTICLES OF MANUFACTURE TO GENERATE A TURN PATH FOR A VEHICLE

FIELD OF THE DISCLOSURE

This disclosure relates generally to vehicle steering and, more particularly, to methods, apparatus, and articles of manufacture to generate a turn path for a vehicle.

BACKGROUND

Agricultural vehicles have become increasingly automated. Agricultural vehicles may semi-autonomously or fully-autonomously drive and perform operations on fields using implements for planting, spraying, harvesting, fertilizing, stripping/tilling, etc. These autonomous agricultural vehicles include multiple sensors (e.g., Global Navigation Satellite Systems (GNSS), Global Positioning Systems (GPS), Light Detection and Ranging (LIDAR), Radio Detection and Ranging (RADAR), Sound Navigation and Ranging (SONAR), telematics sensors, Computer Vision (CV) with mono-cameras and/or stereo-cameras, etc.) to help navigate without assistance, or with limited assistance, from human users.

SUMMARY

An example apparatus disclosed herein includes input interface circuitry to obtain a guidance path for a vehicle, turn identification circuitry to identify a turn in the guidance path, and turn pattern selection circuitry to select, from a plurality of predetermined turn patterns, a turn pattern for the turn, where the turn pattern satisfies a condition.

An example non-transitory computer readable medium disclosed herein includes instructions that, when executed, cause at least one processor to at least obtain a guidance path for a vehicle, identify a turn in the guidance path, and select, from a plurality of predetermined turn patterns, a turn pattern for the turn, where the turn pattern satisfies a condition.

An example apparatus disclosed herein includes means for obtaining to obtain a guidance path for a vehicle, means for identifying to identify a turn in the guidance path, and means for selecting to select, from a plurality of predetermined turn patterns, a turn pattern for the turn, where the turn pattern satisfies a condition.

Figure 1:
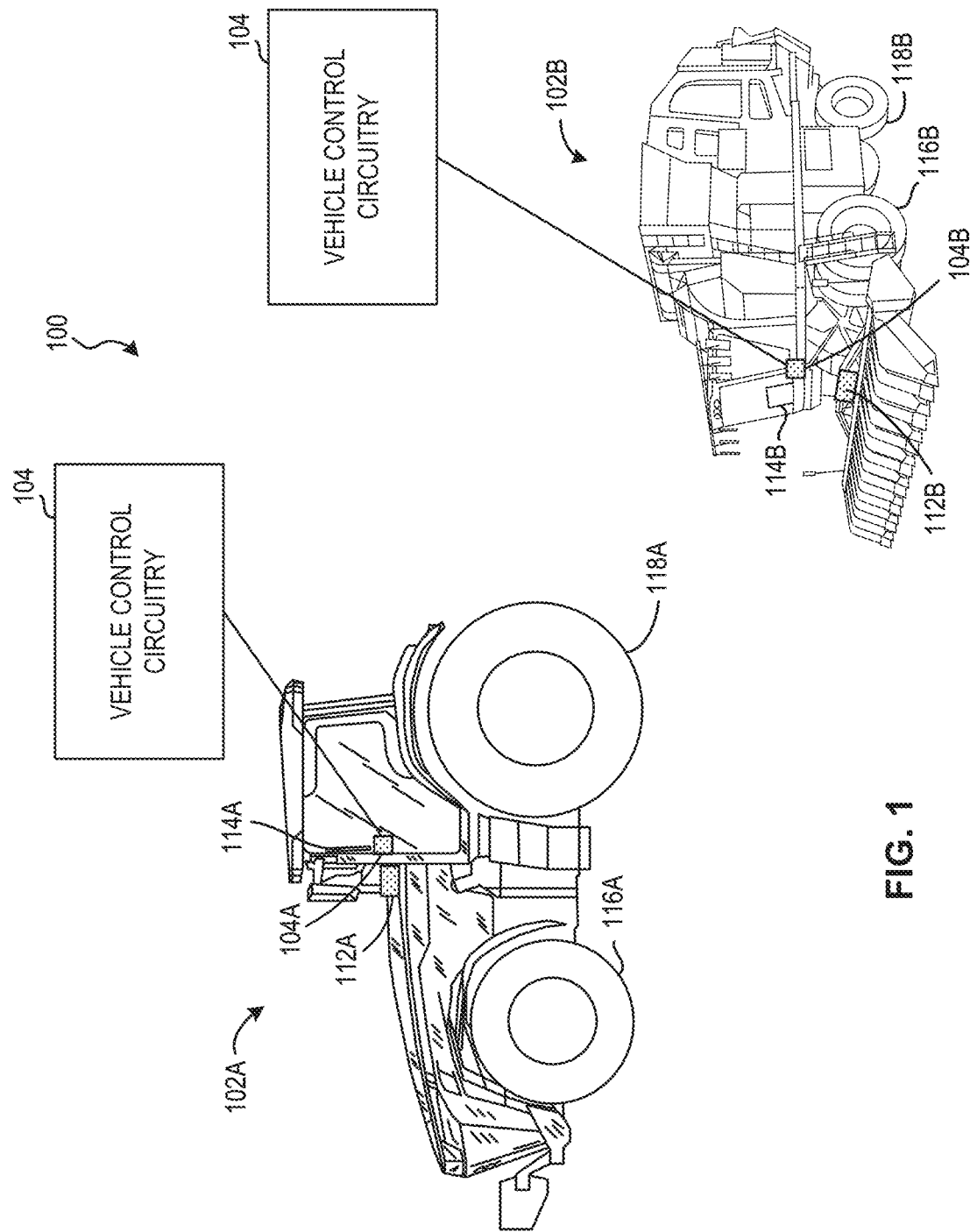
FIG. 1 is a schematic illustration of first and second example vehicles utilizing example vehicle control in accordance with teachings of this disclosure.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Automation of agricultural vehicles is commercially desirable because automation can improve the accuracy with which operations are performed, reduce operator fatigue, improve efficiency, and accrue other benefits. Some automated vehicles include and/or are otherwise enabled for automation functionality, but the user may need to engage and/or disengage the automation functionality. For example, a user could switch a vehicle into an autonomous mode of operation, but the vehicle would not autonomously drive until the user presses a button or toggles a switch to "engage" automation. As such, the vehicle can be referred to as being in a "standby" autonomous mode of operation when automation is enabled but not engaged and in a "fully" autonomous mode of operation when automation is enabled and engaged. In either standby autonomous mode or fully autonomous mode, a user may be present within the vehicle.

Whether in standby autonomous mode or fully autonomous mode, autonomous vehicles include one or more controllers to ensure that the autonomous vehicles traverse terrain properly. In examples disclosed herein, automated vehicles follow guidance paths when in fully autonomous mode. A controller may have many different modes of operation including an acquisition mode of operation and a tracking mode of operation. As used herein, "tracking," "tracking mode," "tracking mode of operation," and/or their derivatives refer to following and/or tracking a guidance path (e.g., in a fully autonomous mode). As used herein, "acquisition," "acquisition mode," "acquisition mode of operation," and/or their derivatives refer to operation when the vehicle is travelling to a guidance path, a path, and/or acquiring a position that is substantially similar to (e.g., within one meter of, within a half meter of, within two meters of, etc.) a guidance path. The path a vehicle takes or may take during acquisition mode is referred to herein as "an acquisition path," and "an acquisition line," among others.

Guidance paths (e.g., target paths) are used by a navigation and/or location apparatus (e.g., a Global Positioning System (GPS) receiver) and a controller in tracking mode to cause a vehicle to follow a prescribed path. In some examples, the prescribed path includes turns, curves, etc., for the vehicle to follow when operating in a field. Conventional controllers, sometimes referred to as guidance systems, allow users of a vehicle to specify a guidance path for the vehicle in the cab.

Some known guidance systems generate steering commands to automatically steer a vehicle along a guidance path. In some locations along the guidance path, the guidance path includes sharp turns and/or corners that may not be easily traversed by the vehicle. In some cases, a turn radius of a turn along the guidance path is less than a minimum turn radius of the vehicle, the implement, and/or a combination of the vehicle and the implement. Thus, in some such cases, the vehicle is unable to accurately track the guidance path at the turn. As such, some known guidance systems require a backup of the vehicle at the turn and/or require an operator of the vehicle to manually steer the vehicle around the turn, and the guidance systems may resume automated tracking after completion of the turn. In some cases, manual operation of the vehicle may result in inefficiencies such as repeated operations over portions of a field and/or gaps in coverage of the field. Furthermore, requiring manual operation of the vehicle reduces convenience for the operator.

Examples disclosed herein enable automatic detection of a sharp turn along a guidance path, selection of a turn pattern for the sharp turn, generation of turn paths for executing the turn pattern at the sharp turn, and tracking of the turn paths by a vehicle and/or an implement of the vehicle. In some examples, the turn paths may include one or more backup paths (e.g., along which the vehicle travels in a reverse direction) and locations at which the vehicle is to raise and/or lower the implement to prevent and/or other reduce gaps in coverage of the implement. Example vehicle control circuitry disclosed herein obtains a guidance path for the vehicle and/or an implement of the vehicle, and obtains other vehicle data associated with the vehicle (e.g., a current position of the vehicle, a threshold turn radius of the vehicle and/or the implement, etc.). In some examples, the vehicle control circuitry identifies one or more sharp turns in the guidance path. In examples disclosed herein, a sharp turn refers to a portion of the guidance path at which a curvature of the guidance path is greater than a minimum turn radius (e.g., a threshold turn radius) of the vehicle, the implement, and/or a combination of the vehicle and the implement. The example vehicle control circuitry selects a turn pattern from a plurality of predetermined turn patterns that satisfies a condition. For example, the vehicle control circuitry determines that the turn pattern satisfies the condition by determining that the turn pattern is within a boundary of a headland region of a field, the turn pattern does not include a turn radius less than the threshold turn radius of the vehicle, and/or the turn pattern does not include a curved backup path. In some examples, the vehicle control circuitry generates navigation instructions based on the selected turn pattern to steer the vehicle thereupon. Advantageously, by automating selection and/or tracking of predetermined turn patterns, examples disclosed herein reduce gaps in coverage along a guidance path and/or reduce input required by a user, thus improving efficiency of operation of the vehicle.

FIG. 1 is a schematic illustration of an example environment 100 including a first example vehicle 102A and a second example vehicle 102B. In the illustrated example of FIG. 1, the first vehicle 102A utilizes first example vehicle control circuitry 104A, and the second vehicle 102B utilizes second example vehicle control circuitry 104B. In this example, the vehicle control circuitry 104A, 104B guides the first vehicle 102A and the second vehicle 102B, respectively, along one or more guidance paths (e.g., travel paths). The first vehicle 102A includes an example Global Positioning System (GPS) receiver 112A, an example user interface 114A, front wheels (one of which is shown at reference numeral 116A), and rear wheels (one of which is shown at reference numeral 118A). The second vehicle 102B includes an example Global Positioning System (GPS) receiver 112B, an example user interface 114B, front wheels (one of which is shown at reference numeral 116B), and rear wheels (one of which is shown at reference numeral 118B).

As illustrated and described herein, the structure and/or function of any one of the vehicle control circuitry 104B, the GPS receiver 112B, the user interface 114B, the front wheels (e.g., the front wheel 116B), and/or the rear wheels (e.g., the rear wheel 118B), may be the same as the corresponding component on the first vehicle 102A. Therefore, for example, description and/or illustration associated with the first vehicle control circuitry 104A of the first vehicle 102A can be considered to apply equally to the second vehicle control circuitry 104B of the second vehicle 102B.

As used herein, when referring to "the vehicle 102," it is to be understood that the description and/or illustration applies to both the first vehicle 102A and the second vehicle 102B. Similarly, when referring to any one or more of the components of the first vehicle 102A or the second vehicle 102B, if a component is discussed (e.g., the vehicle control circuitry 104, the GPS receiver 112, the user interface 114, the front wheel 116, the rear wheel 118, etc.), it is to be understood that the illustration and/or description applies to these respective parts on both of the first vehicle 102A and the second vehicle 102B.

In the example illustrated in FIG. 1, the first vehicle 102A is a tractor and the second vehicle 102B is a cotton stripper. However, the first vehicle 102A and the second vehicle 102B may be any type of vehicle (e.g., a tractor, front loader, harvester, cultivator, or any other suitable vehicle) configured to track a projected path and/or curved path. For example, the first vehicle 102A may be a tractor capable of automatically tracking a row of crops to harvest the row of crops. The first vehicle 102A and/or the second vehicle 102B may be a front wheel steer vehicle or a rear wheel steer vehicle. As used herein, a front wheel steer vehicle steers by pivoting its front wheels (such as the front wheel 116A) with respect to a vehicle frame, while a rear wheel steer vehicle steers by pivoting its rear wheels (such as the rear wheel 118B) with respect to a vehicle frame.

In some examples, the vehicle 102 may be implemented as an articulated vehicle that includes a different steering system as compared to front wheel and/or rear wheel steer vehicles. In examples disclosed herein, the vehicle 102 is equipped with the vehicle control circuitry 104 to control and/or otherwise command the vehicle 102 to track a predetermined path. For example, the vehicle control circuitry 104 controls steering of the vehicle 102 by adjusting a rotation speed and/or direction of the front and/or rear wheels 116, 118.

In the illustrated example of FIG. 1, the first vehicle 102A is implemented as a front wheel steer vehicle. As such, the first vehicle 102A turns in response to pivoting of the front wheel 116A. For example, if the user or an autonomous driving system decides to turn left, the front wheel 116A is pivoted to the left. The second vehicle 102B is implemented as a rear wheel steer vehicle. As such, the second vehicle 102B turns in response to pivoting of the rear wheel 118B. In examples disclosed herein, the front wheels 116A, 116B are located on a front wheel axle with one or more additional corresponding front wheels. Likewise, in examples disclosed herein, the rear wheels 118A, 118B are located on a rear wheel axle with one or more additional corresponding rear wheels.

In the illustrated example of FIG. 1, the GPS receiver 112 communicates with the vehicle control circuitry 104 to provide and/or otherwise transmit position data (e.g., a current position of the vehicle 102) thereto. In some examples, the GPS receiver 112 samples the current position of the vehicle 102 at a threshold interval. For example, every 0.1 seconds, the GPS receiver 112 may send the current position to the vehicle control circuitry 104 for use in selecting one or more turn patterns for the vehicle 102.

In the illustrated example of FIG. 1, the user interface 114 enables an operator of the vehicle 102 to provide inputs to the vehicle control circuitry 104. In some examples, the user interface 114 is implemented by a liquid crystal display (LCD) touch screen such as a tablet, a computer monitor, etc. In the example of FIG. 1, the user interface 114 is an interactive display on which the operator may select and/or enter desired inputs (e.g., select a screen display, enter desired vehicle speed, select a sampling interval, power on and/or off the vehicle, etc.) before, during, and/or after operation of the vehicle 102. In some examples, the user interface 114 enables the operator to select a desired turn pattern from among one or more turn pattern preloaded in the vehicle control circuitry 104. In some examples, the user interface 114 displays a map that illustrates one or more guidance paths to be traversed by the vehicle 102 and/or by an implement of the vehicle 102.

Figure 2:
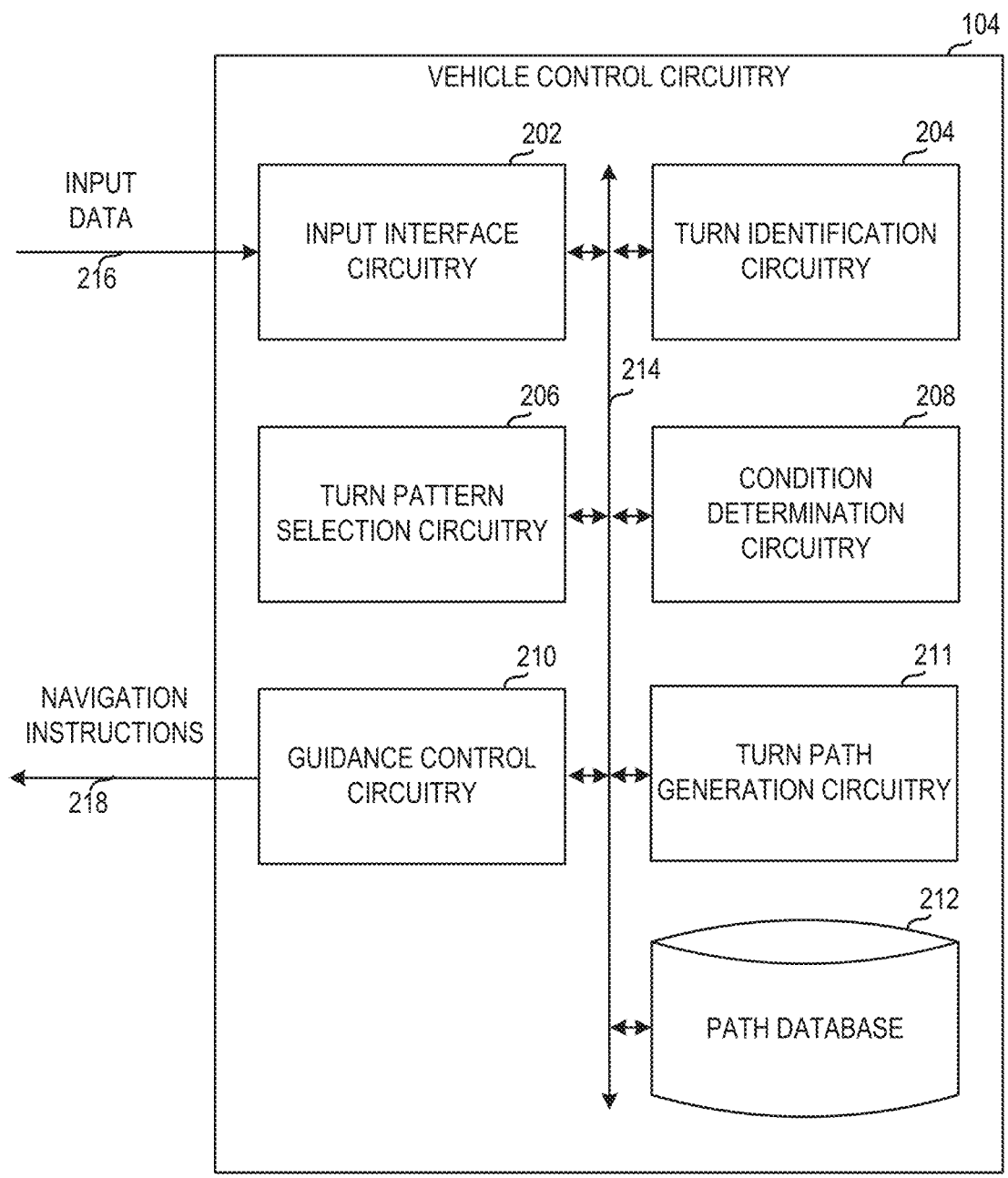
FIG. 2 is a block diagram of the example vehicle control circuitry of FIG. 1.

FIG. 2 is a block diagram of the example vehicle control circuitry 104 of FIG. 1. The example vehicle control circuitry 104 is configured to select one or more turn pattern for the vehicle 102 of FIG. 1 and steer the vehicle 102 along the one or more turn pattern. In the illustrated example of FIG. 2, the vehicle control circuitry 104 includes example input interface circuitry 202, example turn identification circuitry 204, example turn pattern selection circuitry 206, example condition determination circuitry 208, example guidance control circuitry 210, example turn path generation circuitry 211, and example path database circuitry 212. In the example of FIG. 2, any of the input interface circuitry 202, the turn identification circuitry 204, the turn pattern selection circuitry 206, the condition determination circuitry 208, the guidance control circuitry 210, the turn path generation circuitry 211, and/or the path database circuitry 212 can communicate via an example communication bus 214.

In examples disclosed herein, the communication bus 214 may be implemented using any suitable wired and/or wireless communication. In additional or alternative examples, the communication bus 214 includes software, machine readable instructions, and/or communication protocols by which information is communicated among the input interface circuitry 202, the turn identification circuitry 204, the turn pattern selection circuitry 206, the condition determination circuitry 208, the guidance control circuitry 210, the turn path generation circuitry 211, and/or the path database circuitry 212.

In the illustrated example of FIG. 2, the path database circuitry 212 stores data utilized and/or obtained by the vehicle control circuitry 104. In some examples, the path database circuitry 212 stores a current position of the vehicle 102, one or more guidance paths to be traversed by the vehicle 102, and/or one or more predetermined turn paths. The example path database circuitry 212 of FIG. 2 is implemented by any memory, storage device and/or storage disc for storing data such as, for example, flash memory, magnetic media, optical media, solid state memory, hard drive(s), thumb drive(s), etc. Furthermore, the data stored in the example path database circuitry 212 may be in any data format such as, for example, binary data, comma delimited data, tab delimited data, structured query language (SQL) structures, etc. While, in the illustrated example, the example path database circuitry 212 is illustrated as a single device, the example path database circuitry 212 and/or any other data storage devices described herein may be implemented by any number and/or type(s) of memories.

In the illustrated example of FIG. 2, the input interface circuitry 202 provides data to the turn identification circuitry 204, the turn pattern selection circuitry 206, the condition determination circuitry 208, the guidance control circuitry 210, and/or the path database circuitry 212. In this example, the input interface circuitry 202 is communicatively coupled to the user interface 114 and/or the GPS receiver 112 of FIG. 1 to receive and/or otherwise obtain example input data 216 therefrom. For example, the input interface circuitry 202 obtains the current position of the vehicle 102 from the GPS receiver 112, and/or obtains a guidance path of the vehicle 102 selected by a user via the user interface 114. In some examples, the guidance path is preloaded in the input interface circuitry 202 and/or the path database circuitry 212. In some examples, the input interface circuitry 202 receives and/or otherwise obtains, from the user interface 114, a desired turn pattern selected by the user from a plurality of turn patterns preloaded in the path database circuitry 212.

In some examples, the vehicle control circuitry 104 includes means for obtaining. For example, the means for obtaining may be implemented by the input interface circuitry 202. In some examples, the input interface circuitry 202 may be implemented by machine executable instructions such as that implemented by at least block 1502 of FIG. 15 executed by processor circuitry, which may be implemented by the example processor circuitry 1612 of FIG. 16, the example processor circuitry 1700 of FIG. 17, and/or the example Field Programmable Gate Array (FPGA) circuitry 1800 of FIG. 18. In other examples, the input interface circuitry 202 is implemented by other hardware logic circuitry, hardware implemented state machines, and/or any other combination of hardware, software, and/or firmware. For example, the input interface circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 2, the turn identification circuitry 204 identifies turns and/or corners in the guidance path to be traversed by the vehicle 102. In some examples, the turn identification circuitry 204 obtains the guidance path from the input interface circuitry 202 and/or from the path database circuitry 212, and identifies locations along the guidance path at which a turn radius of the guidance path is less than a threshold turn radius. In some examples, the threshold turn radius corresponds to a minimum turn radius that can be traversed by the vehicle 102 and/or by an implement of the vehicle 102. In some examples, the turn identification circuitry 204 determines the threshold turn radius based on the input data 216 from the GPS receiver 112 of FIG. 1. For example, the minimum turn radius of the vehicle 102 can be determined by an operator of the vehicle 102 manually turning the vehicle 102 fully to the left or fully to the right, and the GPS receiver 112 measuring positions of the vehicle 102 and/or the implement of the vehicle 102 during travel. In such examples, the turn identification circuitry 204 obtains the measured positions of the vehicle 102 and/or the implement of the vehicle 102 from the input data 216, and calculates and/or otherwise determines the threshold turn radius based on the measured positions. In other examples, a value of the threshold turn radius is input by the operator via the user interface 114 and/or is preloaded in the turn identification circuitry 204.

In some examples, the locations along the guidance path that are less than the threshold turn radius correspond to sharp turns and/or corners in the guidance path. In some examples, the turn identification circuitry 204 stores the locations (e.g., turn locations) as GPS coordinates in the path database circuitry 212. Additionally or alternatively, the turn identification circuitry 204 provides the locations to the turn pattern selection circuitry 206 for use in selecting turn patterns. In some examples, the turn identification circuitry 204 monitors the current position of the vehicle 102 when it traverses the guidance path. In such examples, when the turn identification circuitry 204 determines that the current position of the vehicle 102 is less than a threshold distance from a turn, the turn identification circuitry 204 directs the turn pattern selection circuitry 206 to select a turn pattern for the turn.

Figure 3:
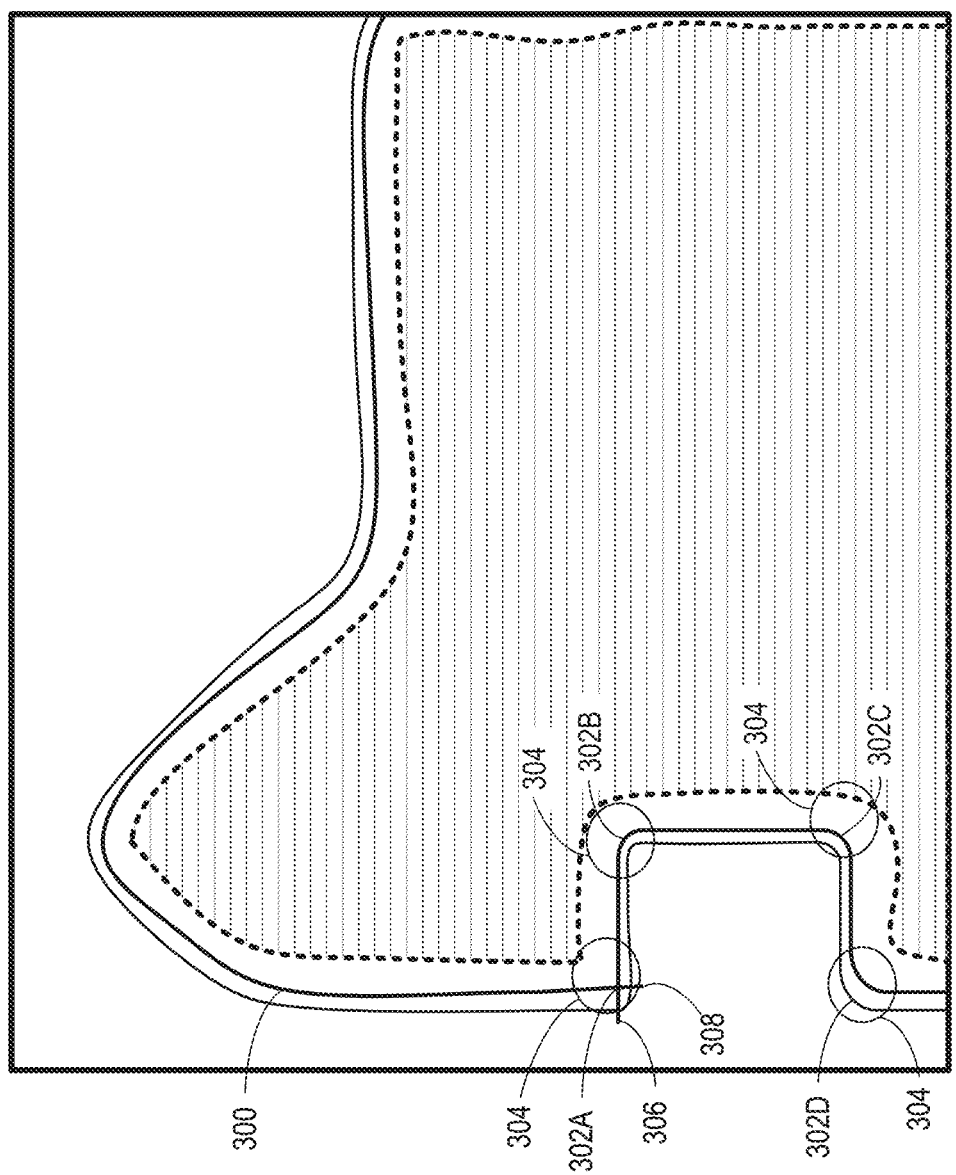
FIG. 3 illustrates an example guidance path for the example vehicle of FIG. 1.

In some examples, the turn identification circuitry 204 modifies the guidance path of the vehicle 102 by placing and/or generating a minimum turn circle at each of the turn locations, where a radius of the minimum turn circle corresponds to the threshold turn radius. In some such examples, as shown in FIG. 3 below, the turn identification circuitry 204 breaks the guidance path into two segments at each of the turn locations, and extends the two segments along directions that are tangent to the minimum turn circle. In some examples, the turn identification circuitry 204 provides the modified guidance path to the turn pattern selection circuitry 206 for use in selecting and/or generating turn patterns.

In some examples, the vehicle control circuitry 104 includes means for identifying. For example, the means for identifying may be implemented by the turn identification circuitry 204. In some examples, the turn identification circuitry 204 may be implemented by machine executable instructions such as that implemented by at least block 1504 of FIG. 15 executed by processor circuitry, which may be implemented by the example processor circuitry 1612 of FIG. 16, the example processor circuitry 1700 of FIG. 17, and/or the example Field Programmable Gate Array (FPGA) circuitry 1800 of FIG. 18. In other examples, the turn identification circuitry 204 is implemented by other hardware logic circuitry, hardware implemented state machines, and/or any other combination of hardware, software, and/or firmware. For example, the turn identification circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 2, the turn pattern selection circuitry 206 selects and/or generates a turn pattern to be traversed by the vehicle 102. In some examples, one or more predetermined turn pattern are preloaded in the turn pattern selection circuitry 206 and/or stored in the path database circuitry 212. In some examples, the turn pattern selection circuitry 206 selects the turn pattern from the predetermined turn pattern shown in FIGS. 4-8 below. However, in other examples, other turn pattern may be used instead of or in addition to the turn pattern shown in FIGS. 4-8. In examples disclosed herein, the predetermined turn pattern satisfy the threshold turn radius of the vehicle 102 and/or a threshold backup speed (e.g., 2 miles per hour). In some examples, the threshold turn radius and/or the threshold backup speed are preloaded in the turn pattern selection circuitry 206 and/or obtained via user input from the user interface 114.

In some examples, the turn pattern selection circuitry 206 selects the turn pattern based on a predetermined sequence of the turn patterns, and provides the selected turn pattern to the condition determination circuitry 208 for use in determining whether the selected turn pattern satisfies a condition. Alternatively, in some examples, the turn pattern selection circuitry 206 selects the turn pattern based on user input obtained in the input data 216 from the user interface 114. For example, the user interface 114 can display the predetermined turn pattern, and an operator of the vehicle 102 may select the turn pattern via the user interface 114.

In some examples, the turn pattern selection circuitry 206 selects the turn pattern based on coverage of the predetermined turn patterns. For example, the turn pattern selection circuitry 206 determines the coverage for each of the predetermined turn pattern, and selects the turn pattern corresponding to the largest area of coverage. In other examples, the turn pattern selection circuitry 206 selects the turn pattern corresponding to the fewest and/or smallest gaps in coverage. Additionally or alternatively, the turn pattern selection circuitry 206 determines a length and/or coverage of tire tracks to be made by the vehicle 102 when traversing each of the predetermined turn pattern, and selects the turn pattern corresponding to the smallest length and/or coverage of the tire tracks.

In some examples, the vehicle control circuitry 104 includes means for selecting. For example, the means for selecting may be implemented by the turn pattern selection circuitry 206. In some examples, the turn pattern selection circuitry 206 may be implemented by machine executable instructions such as that implemented by at least block 1506 of FIG. 15 executed by processor circuitry, which may be implemented by the example processor circuitry 1612 of FIG. 16, the example processor circuitry 1700 of FIG. 17, and/or the example Field Programmable Gate Array (FPGA) circuitry 1800 of FIG. 18. In other examples, the turn pattern selection circuitry 206 is implemented by other hardware logic circuitry, hardware implemented state machines, and/or any other combination of hardware, software, and/or firmware. For example, the turn pattern selection circuitry 206 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 2, the turn path generation circuitry 211 generates one or more turn paths for the selected turn pattern. For example, the one or more turn paths can be traversed by the vehicle 102 to traverse the selected turn pattern. Additionally, in some examples, the turn path generation circuitry 211 determines locations along the one or more turns paths at which the vehicle 102 is to raise and/or lower the implement. In some examples, the turn path generation circuitry 211 causes storage of the one or more turns paths and/or the locations for raising and/or lowering of the implement in the path database circuitry 212.

In some examples, the vehicle control circuitry 104 includes means for generating turn paths. For example, the means for generating turn paths may be implemented by the turn path generation circuitry 211. In some examples, the turn path generation circuitry 211 may be implemented by machine executable instructions such as that implemented by at least block 1506 of FIG. 15 executed by processor circuitry, which may be implemented by the example processor circuitry 1612 of FIG. 16, the example processor circuitry 1700 of FIG. 17, and/or the example Field Programmable Gate Array (FPGA) circuitry 1800 of FIG. 18. In other examples, the turn path generation circuitry 211 is implemented by other hardware logic circuitry, hardware implemented state machines, and/or any other combination of hardware, software, and/or firmware. For example, the turn path generation circuitry 211 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 2, the condition determination circuitry 208 determines whether the selected turn pattern satisfies one or more conditions. In some examples, the condition is based on whether the one or more turn paths of the turn pattern are within a boundary of a headland region of a field (e.g., a work area). In some such examples, the turn pattern satisfies the condition when the one or more turn paths are within the boundary of the headland region, and the turn pattern does not satisfy the condition when at least one of the one or more turn paths crosses the boundary of the headland region. In other examples, the condition determination circuitry 208 determines whether coverage by an implement of the vehicle 102 is within the boundary of the headland region when the vehicle 102 traverses the turn pattern, and determines that the turn pattern satisfies the condition when the coverage by the implement is within the boundary. In some examples, the condition determination circuitry 208 determines that the turn pattern satisfies the condition when the vehicle 102 does not cross the boundary of the headland region when traversing the turn pattern.

In some examples, in response determining that the selected turn pattern does not satisfy the condition, the condition determination circuitry 208 directs the turn pattern selection circuitry 206 to select a different turn pattern from the predetermined turn patterns. Alternatively, in response to determining that the turn pattern satisfies the condition, the condition determination circuitry 208 provides the turn pattern to the guidance control circuitry 210 for use in generating example navigation instructions 218.

In some examples, the vehicle control circuitry 104 includes means for determining. For example, the means for determining may be implemented by the condition determination circuitry 208. In some examples, the condition determination circuitry 208 may be implemented by machine executable instructions such as that implemented by at least block 1508 of FIG. 15 executed by processor circuitry, which may be implemented by the example processor circuitry 1612 of FIG. 16, the example processor circuitry 1700 of FIG. 17, and/or the example Field Programmable Gate Array (FPGA) circuitry 1800 of FIG. 18. In other examples, the condition determination circuitry 208 is implemented by other hardware logic circuitry, hardware implemented state machines, and/or any other combination of hardware, software, and/or firmware. For example, the condition determination circuitry 208 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 2, the guidance control circuitry 210 generates the navigation instructions 218 based on the turn pattern. In some examples, the navigation instructions 218 include one or more path paths generated by the turn path generation circuitry 211 for the turn pattern, and include directions (e.g., forward or backward) in which the vehicle 102 is to travel along the one or more turn paths. Furthermore, the navigation instructions 218 include one or more first locations at which an implement of the vehicle 102 is to be raised and/or one or more second locations at which the implement of the vehicle 102 is to be lowered. In some examples, the navigation instructions 218 include speeds at which the vehicle 102 is to traverse the one or more turn paths. In some examples, the navigation instructions 218 cause steering of wheels (e.g., the front wheel 116 and/or the rear wheel 118) of the vehicle 102. For example, the navigation instructions 218 control an angle at which the wheels turn and/or a rotation speed of the wheels to move the vehicle 102 along the turn path.

In some examples, the vehicle control circuitry 104 includes means for generating instructions. For example, the means for generating instructions may be implemented by the guidance control circuitry 210. In some examples, the guidance control circuitry 210 may be implemented by machine executable instructions such as that implemented by at least block 1510 of FIG. 15 executed by processor circuitry, which may be implemented by the example processor circuitry 1612 of FIG. 16, the example processor circuitry 1700 of FIG. 17, and/or the example Field Programmable Gate Array (FPGA) circuitry 1800 of FIG. 18. In other examples, the guidance control circuitry 210 is implemented by other hardware logic circuitry, hardware implemented state machines, and/or any other combination of hardware, software, and/or firmware. For example, the guidance control circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

FIG. 3 illustrates an example guidance path 300 for the example vehicle 102 of FIG. 1. In some examples, the guidance path 300 is preloaded on the vehicle control circuitry 104 of FIG. 2 and/or stored in the path database circuitry 212 of FIG. 2. In the illustrated example of FIG. 3, the turn identification circuitry 204 of FIG. 2 obtains the guidance path 300 from the path database circuitry 212 and identifies example turns (e.g., sharp turns, corners) 302A, 302B, 302C, 302D in the guidance path 300. For example, the turn identification circuitry 204 identifies the turns 302A, 302B, 302C, 302D by identifying locations in the guidance path 300 at which a turn radius of the guidance path 300 is less than a threshold turn radius of the vehicle 102 and/or an implement of the vehicle 102.

In the illustrated example of FIG. 3, the turn identification circuitry 204 modifies the guidance path 300 at each of the turns 302A, 302B, 302C, 302D. For example, the turn identification circuitry 204 generates example minimum turn circles 304 at the turns 302A, 302B, 302C, 302D, where a radius of the minimum turn circles 304 corresponds to the threshold turn radius of the vehicle 102. In some examples, as shown at the first turn 302A, the turn identification circuitry 204 breaks the guidance path 300 into first and second example path sections 306, 308, and extends the first and second path sections 306, 308 in directions tangent to the minimum turn circle 304 at the first turn 302A. In some such examples, the turn pattern selection circuitry 206 of FIG. 2 selects a turn pattern for the first turn 302A that enables the vehicle 102 to travel from the first path section 306 to the second path section 308 without requiring a turn radius less than the threshold turn radius of the vehicle 102. In some examples, the turn pattern selection circuitry 206 selects the turn pattern from the example turn patterns illustrated in FIGS. 4-8 below.

Figure 4:
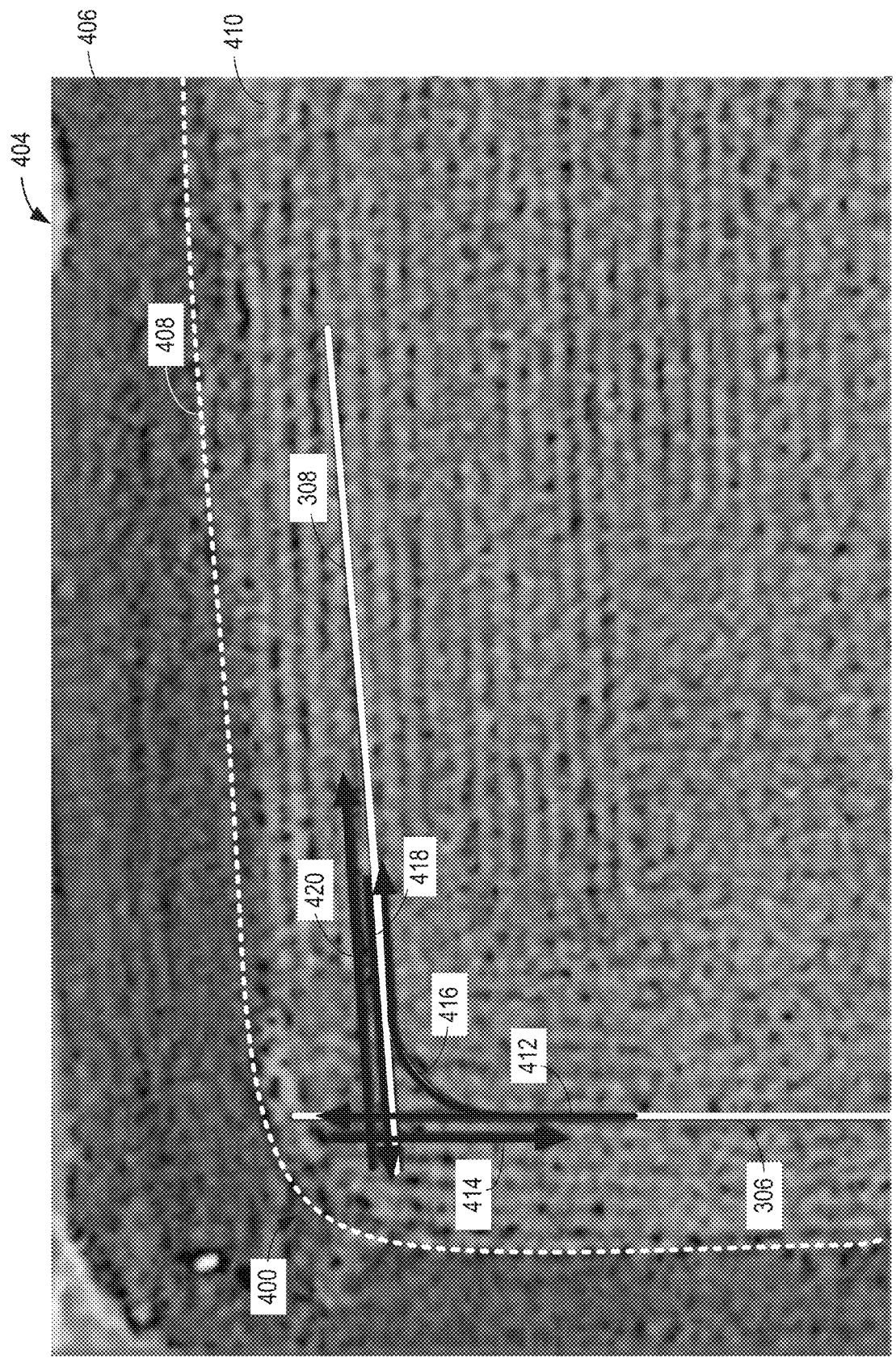
FIG. 4 illustrates a first example turn pattern.

FIG. 4 illustrates a first example turn pattern 400. In some examples, the first turn pattern 400 is stored in the path database circuitry 212 of FIG. 2. In some examples, the turn pattern selection circuitry 206 of FIG. 2 selects the first turn pattern 400 for guiding the vehicle 102 of FIG. 1 along the first turn 302A of FIG. 3 from the first path section 306 to the second path section 308. In the illustrated example of FIG. 4, the vehicle 102 traverses an example field 404 including an example headland region 406 and an example interior boundary 408 separating the headland region 406 from an example work area 410 of the field 404.

In the illustrated example of FIG. 4, to traverse the first turn pattern 400, the vehicle 102 travels forward along a first example forward turn path 412 of the first path section 306, then travels backward along a first example rearward turn path 414 of the first path section 306. The vehicle 102 travels forward from the first path section 306 to the second path section 308 along an example inner curved turn path 416, where a turn radius of the inner curved turn path 416 is greater than the threshold turn radius of the vehicle 102. Furthermore, the vehicle 102 travels backward along a second example rearward turn path 418 of the second path section 308, and travels forward along a second example forward turn path 420 of the second path section 308. Upon completion of the first turn pattern 400, the vehicle 102 can traverse a remainder of the guidance path 300 of FIG. 3.

Figure 5:
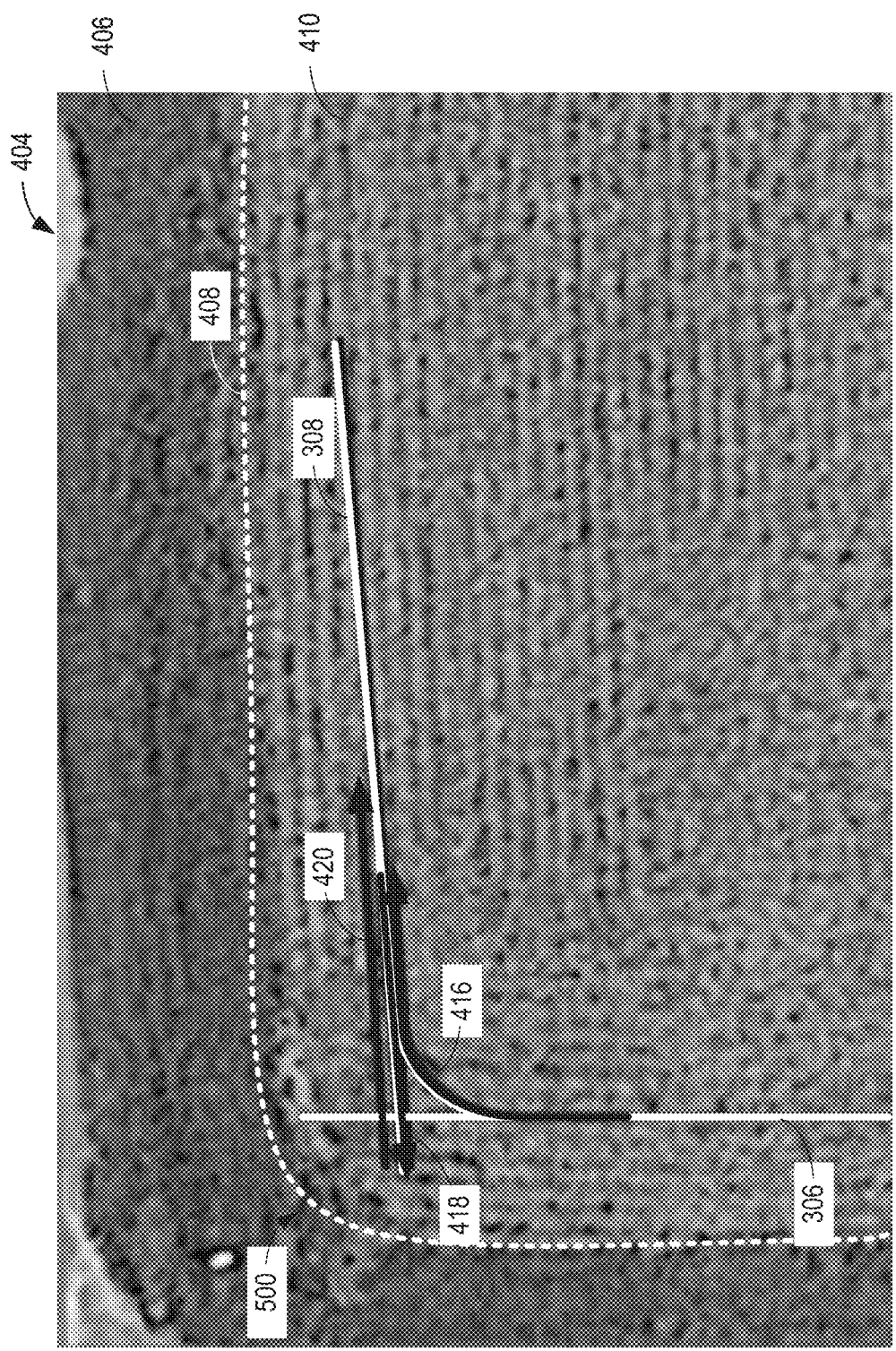
FIG. 5 illustrates a second example turn pattern.

FIG. 5 illustrates a second example turn pattern 500. In some examples, the second turn pattern 500 is stored in the path database circuitry 212 of FIG. 2. In some examples, the turn pattern selection circuitry 206 of FIG. 2 selects the second turn pattern 500 for guiding the vehicle 102 of FIG. 1 along the first turn 302A of FIG. 3 from the first path section 306 to the second path section 308. In some examples, the turn pattern selection circuitry 206 selects the second turn pattern 500 in response to the first turn pattern 400 of FIG. 4 not satisfying a condition. For example, the turn pattern selection circuitry 206 selects the second turn pattern 500 in response to the first turn pattern 400 crossing the interior boundary 408 of the headland region 406. In some examples, the turn pattern selection circuitry 206 selects the second turn pattern 500 in response to determining that a first coverage of the first turn pattern 400 is less than a second coverage of the second turn pattern 500.

In the illustrated example of FIG. 5, to traverse the second turn pattern 400, the vehicle 102 travels forward from the first path section 306 to the second path section 308 along the inner curved turn path 416, then travels rearward along the second rearward turn path 418 and forward along the second forward turn path 420. Upon completion of the second turn pattern 500, the vehicle 102 can traverse a remainder of the guidance path 300 of FIG. 3.

Figure 6:
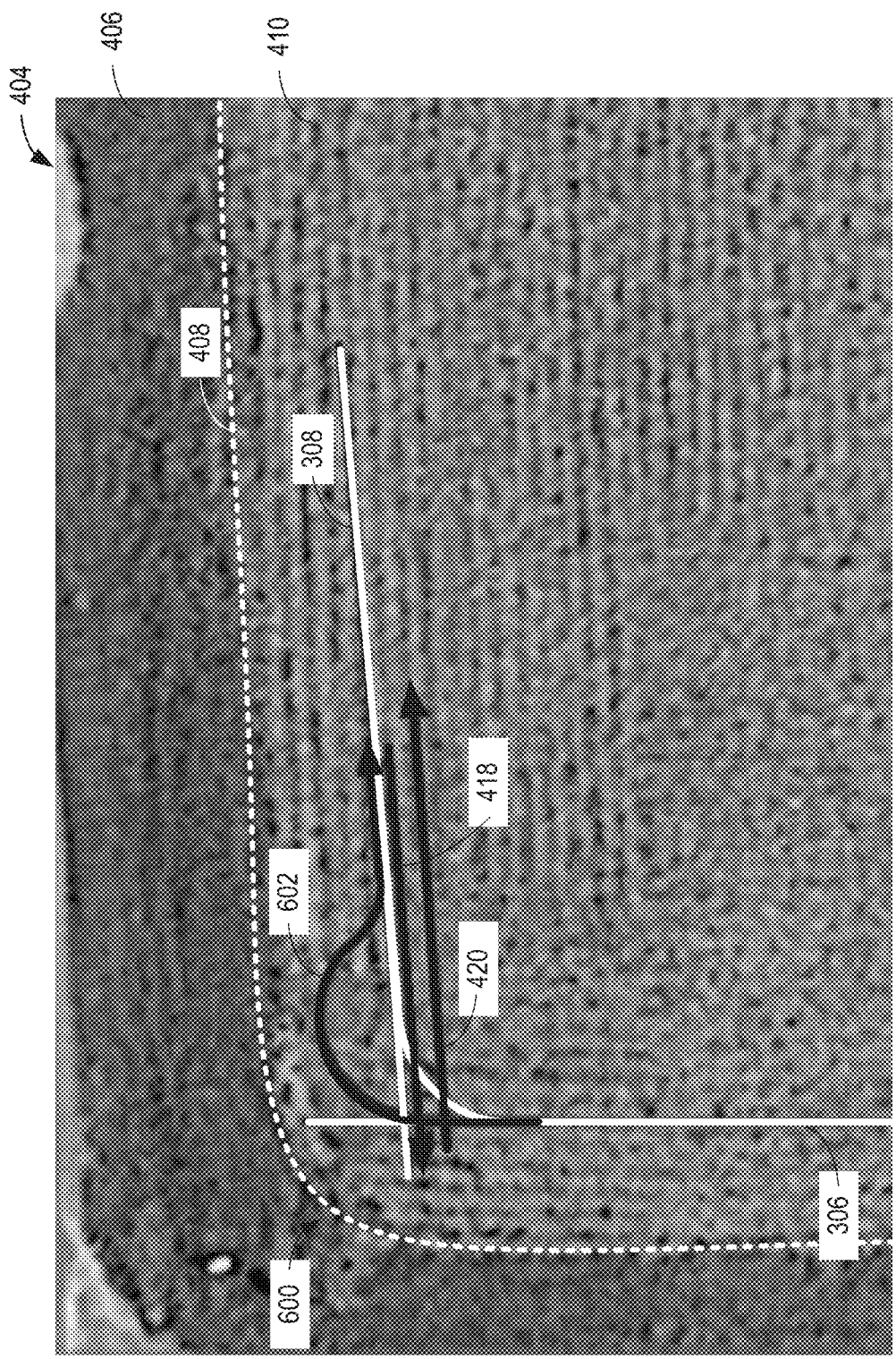
FIG. 6 illustrates a third example turn pattern.

FIG. 6 illustrates a third example turn pattern 600. In some examples, the third turn pattern 600 is stored in the path database circuitry 212 of FIG. 2. In some examples, the turn pattern selection circuitry 206 of FIG. 2 selects the third turn pattern 600 for guiding the vehicle 102 of FIG. 1 along the first turn 302A of FIG. 3 from the first path section 306 to the second path section 308. In some examples, the turn pattern selection circuitry 206 selects the third turn pattern 600 in response to the first turn pattern 400 of FIG. 4 and/or the second turn pattern 500 of FIG. 5 not satisfying a condition. For example, the turn pattern selection circuitry 206 selects the third turn pattern 600 in response to the first turn pattern 400 and/or the second turn pattern 500 crossing the interior boundary 408 of the headland region 406.

In the illustrated example of FIG. 6, to traverse the third turn pattern 600, the vehicle 102 travels forward from the first path section 306 to the second path section 308 along an example outer curved turn path 602, where a turn radius of the outer curved turn path 602 is greater than the threshold turn radius of the vehicle 102. The vehicle 102 then travels backward along the second rearward turn path 418 and forward along the second forward turn path 420. Upon completion of the third turn pattern 600, the vehicle 102 can traverse a remainder of the guidance path 300 of FIG. 3.

Figure 7:
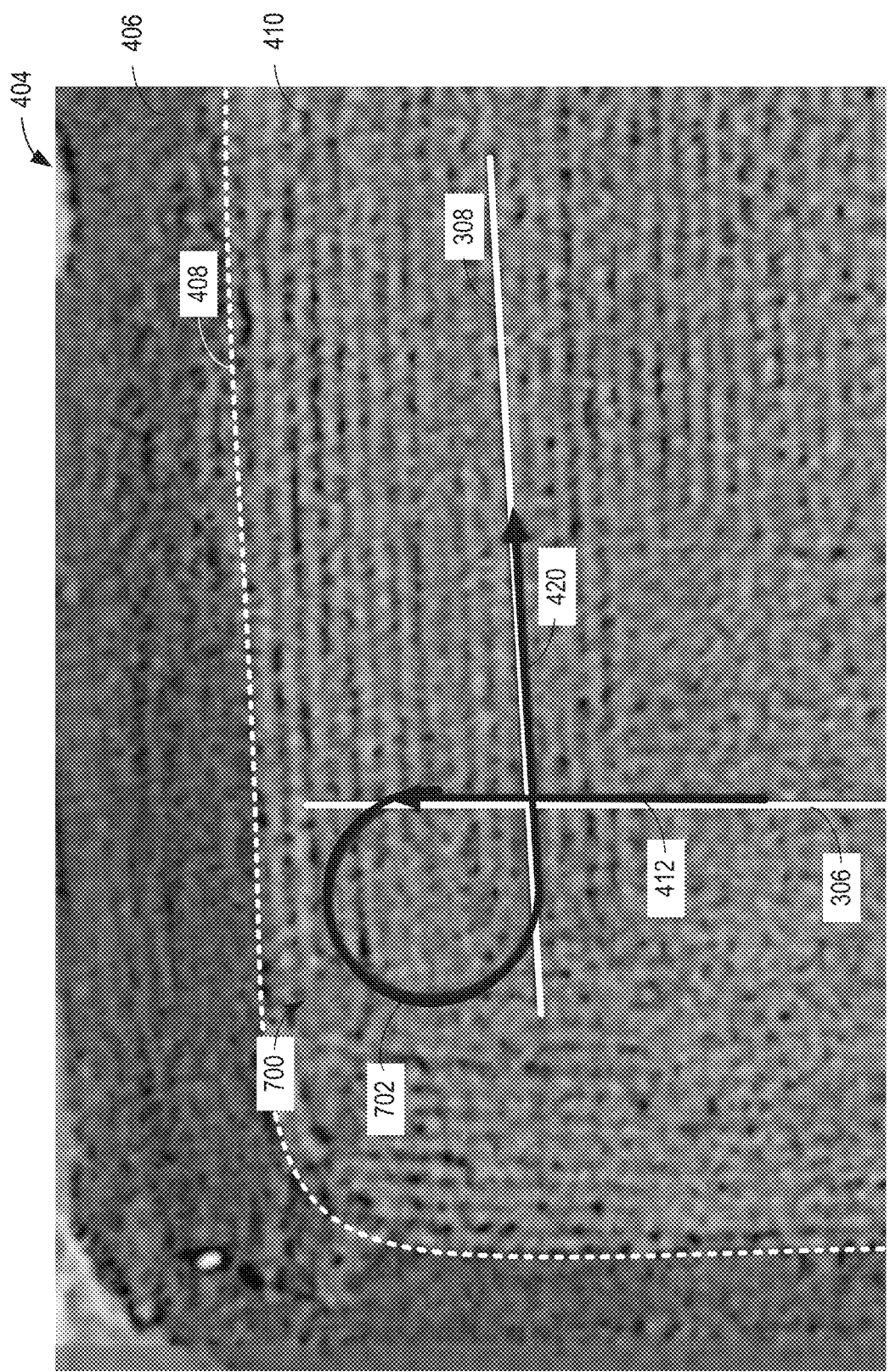
FIG. 7 illustrates a fourth example turn pattern.

FIG. 7 illustrates a fourth example turn pattern 700. In some examples, the fourth turn pattern 700 is stored in the path database circuitry 212 of FIG. 2. In some examples, the turn pattern selection circuitry 206 of FIG. 2 selects the fourth turn pattern 700 for guiding the vehicle 102 of FIG. 1 along the first turn 302A of FIG. 3 from the first path section 306 to the second path section 308. In some examples, the turn pattern selection circuitry 206 selects the fourth turn pattern 700 in response to the first turn pattern 400 of FIG. 4, the second turn pattern 500 of FIG. 5, and/or the third turn pattern 600 of FIG. 6 not satisfying a condition. For example, the turn pattern selection circuitry 206 selects the fourth turn pattern 700 in response to the first turn pattern 400, the second turn pattern 500, and/or the third turn pattern 600 crossing the interior boundary 408 of the headland region 406.

In the illustrated example of FIG. 7, to traverse the fourth turn pattern 700, the vehicle 102 travels forward along the first forward turn path 412 of the first path section 306, and travels forward from the first path section 306 to the second path section 308 along an example looped turn path 702, where a turn radius of the looped turn path 702 is greater than the threshold turn radius of the vehicle 102. The vehicle 102 then travels forward along the second forward turn path 420. Upon completion of the fourth turn pattern 700, the vehicle 102 can traverse a remainder of the guidance path 300 of FIG. 3.

Figure 8:
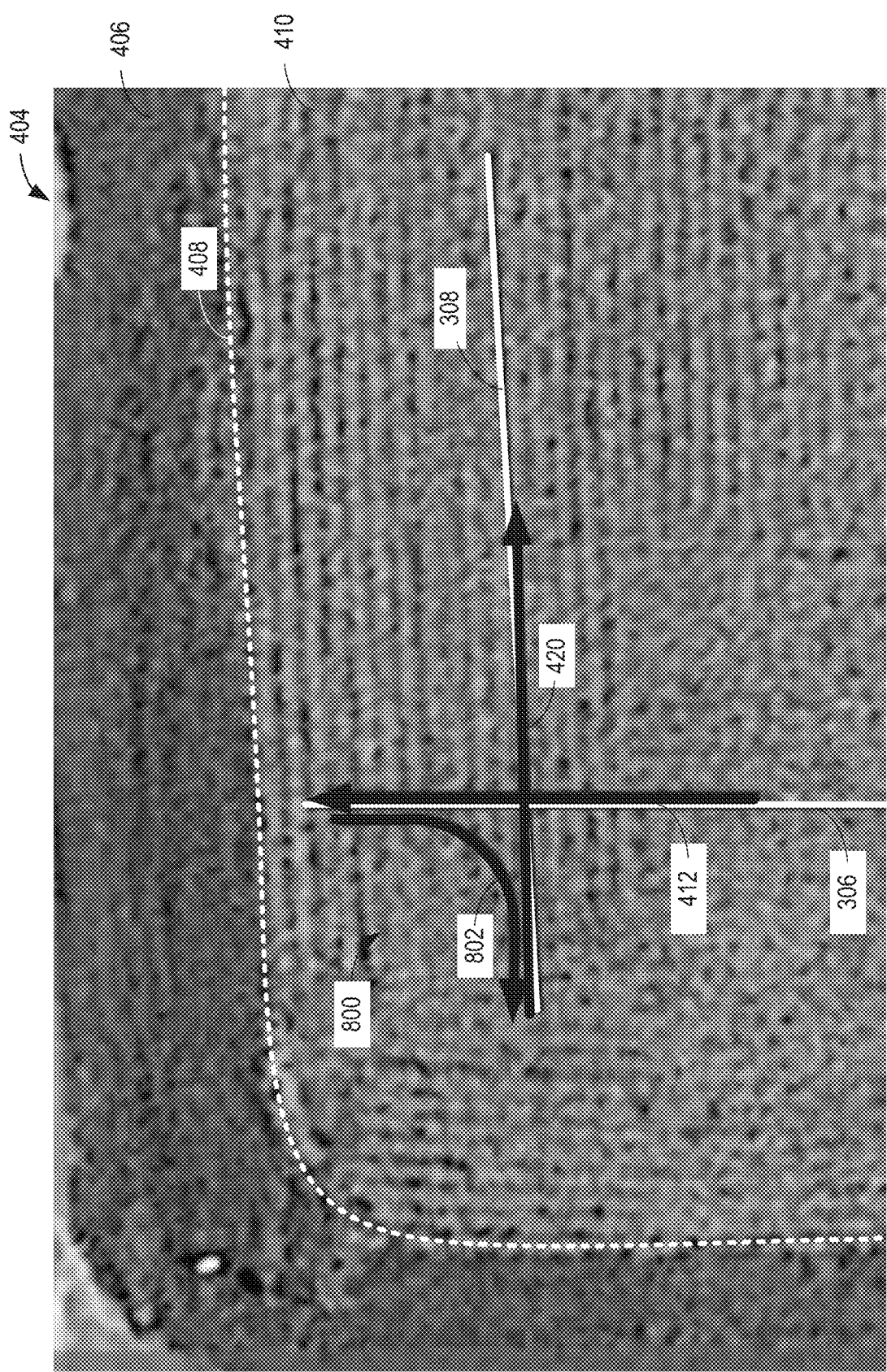
FIG. 8 illustrates a fifth example turn pattern.

FIG. 8 illustrates a fifth example turn pattern 800. In some examples, the fifth turn pattern 800 is stored in the path database circuitry 212 of FIG. 2. In some examples, the turn pattern selection circuitry 206 of FIG. 2 selects the fifth turn pattern 800 for guiding the vehicle 102 of FIG. 1 along the first turn 302A from the first path section 306 to the second path section 308. In some examples, the turn pattern selection circuitry 206 selects the fifth turn pattern 800 in response to the first turn pattern 400 of FIG. 4, the second turn pattern 500 of FIG. 5, the third turn pattern 600 of FIG. 6, and/or the fourth turn pattern 700 of FIG. 7 not satisfying a condition. For example, the turn pattern selection circuitry 206 selects the fifth turn pattern 800 in response to the first turn pattern 400, the second turn pattern 500, the third turn pattern 600, and/or the fourth turn pattern 700 crossing the interior boundary 408 of the headland region 406.

In the illustrated example of FIG. 8, to traverse the fifth turn pattern 800, the vehicle 102 travels forward along the first forward turn path 412 of the first path section 306, and travels backward from the first path section 306 to the second path section 308 along an example backward curved turn path 802, where a turn radius of the backward curved turn path 802 is greater than the threshold turn radius of the vehicle 102. The vehicle 102 then travels forward along the second forward turn path 420. Upon completion of the fifth turn pattern 800, the vehicle 102 can traverse a remainder of the guidance path 300 of FIG. 3. In some examples, the vehicle 102 can traverse the backward curved turn path 802 when an implement of the vehicle 102 is fixed such that the implement does not pivot and/or otherwise rotate relative to the vehicle 102. In other examples, when the implement is not fixed relative to the vehicle 102, the turn pattern selection circuitry 206 selects a different turn pattern (e.g., the first turn pattern 400, the second turn pattern 500, the third turn pattern 600, or the second turn pattern 700) for the vehicle 102.

Figure 9:
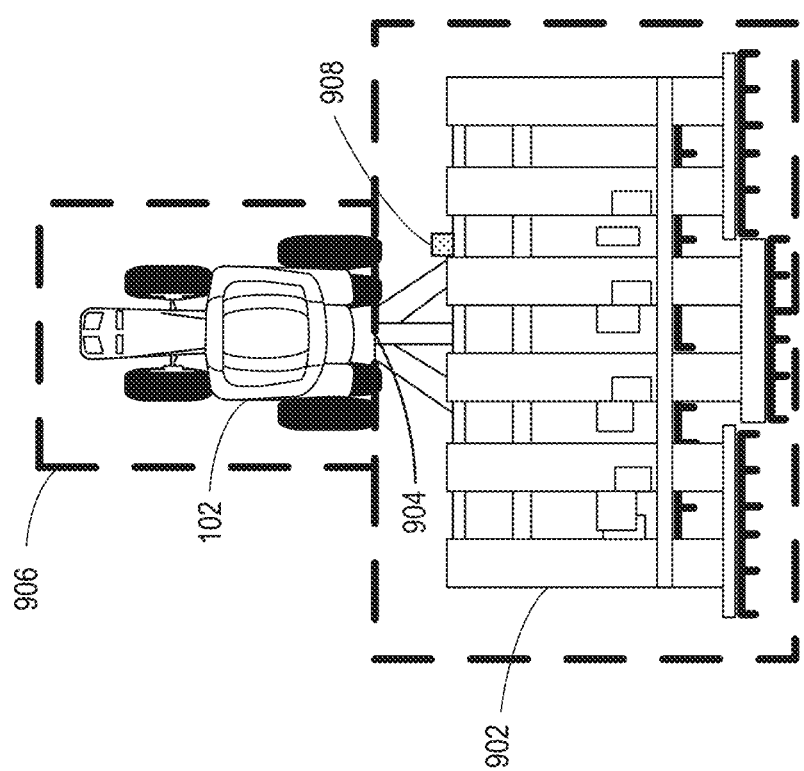
FIG. 9 illustrates a top view of the example vehicle of FIG. 1.

FIG. 9 illustrates a top view of the example vehicle 102 of FIG. 1. In the illustrated example of FIG. 9, an example implement 902 is coupled to the vehicle 102. In some examples, the implement 902 is movable between a raised position and a lowered position, where the implement 902 in the lowered position can perform an operation (e.g., planting, spraying, harvesting, fertilizing, stripping/tilling, etc.) on the field 404 of FIG. 4. For example, the guidance control circuitry 210 of FIG. 2 can cause the vehicle 102 to raise and/or lower the implement 902 via the navigation instructions 218 of FIG. 2. In this example, the implement 902 is rotationally coupled to the vehicle 102 such that the implement 902 can pivot and/or otherwise rotate relative to the vehicle 102 about an example pivot point 904. In other examples, the implement 902 is fixed relative to the vehicle 102. In some examples, the vehicle 102 can travel backward along a curved turn path (e.g., the backward curved turn path 802 of FIG. 8) when the implement 902 is fixed relative to the vehicle 102.

In the illustrated example of FIG. 9, the condition determination circuitry 208 of FIG. 2 defines an example buffer zone 906 around the vehicle 102 and/or the implement 902. In some examples, the condition determination circuitry 208 determines whether a turn pattern (e.g., the first turn pattern 400 of FIG. 4, the second turn pattern 500 of FIG. 5, the third turn pattern 600 of FIG. 6, the fourth turn pattern 700 of FIG. 7, and/or the fifth turn pattern 800 of FIG. 8) satisfies a condition based on whether the buffer zone 906 of the vehicle 102 overlaps the headland region 406 of FIG. 4 when the vehicle 102 traverses the turn pattern. In some examples, the turn pattern selection circuitry 206 selects lengths and/or positions of the turn pattern to ensure that the buffer zone 906 does not overlap the headland region 406. Additionally or alternatively, the turn pattern selection circuitry 206 selects locations at which to raise and/or lower the implement 902 to reduce and/or prevent operation of the implement 902 on the headland region 406. In some such examples, the turn pattern selection circuitry 206 selects the locations to reduce and/or prevent repeat operations of the implement 902 on the work area 410.

In some examples, the vehicle 102 includes an example implement sensor 908 communicatively coupled to the vehicle control circuitry 104 of FIG. 2. In some examples, the implement sensor 908 measures an angular position of the implement 902 relative to the vehicle 102. For example, the vehicle control circuitry 104 can determine, based on the angular position, whether the implement 902 is substantially aligned (e.g., within 5 degrees) with the vehicle 102, and/or whether the implement 902 is rotated relative to the vehicle 102.

Figure 10:
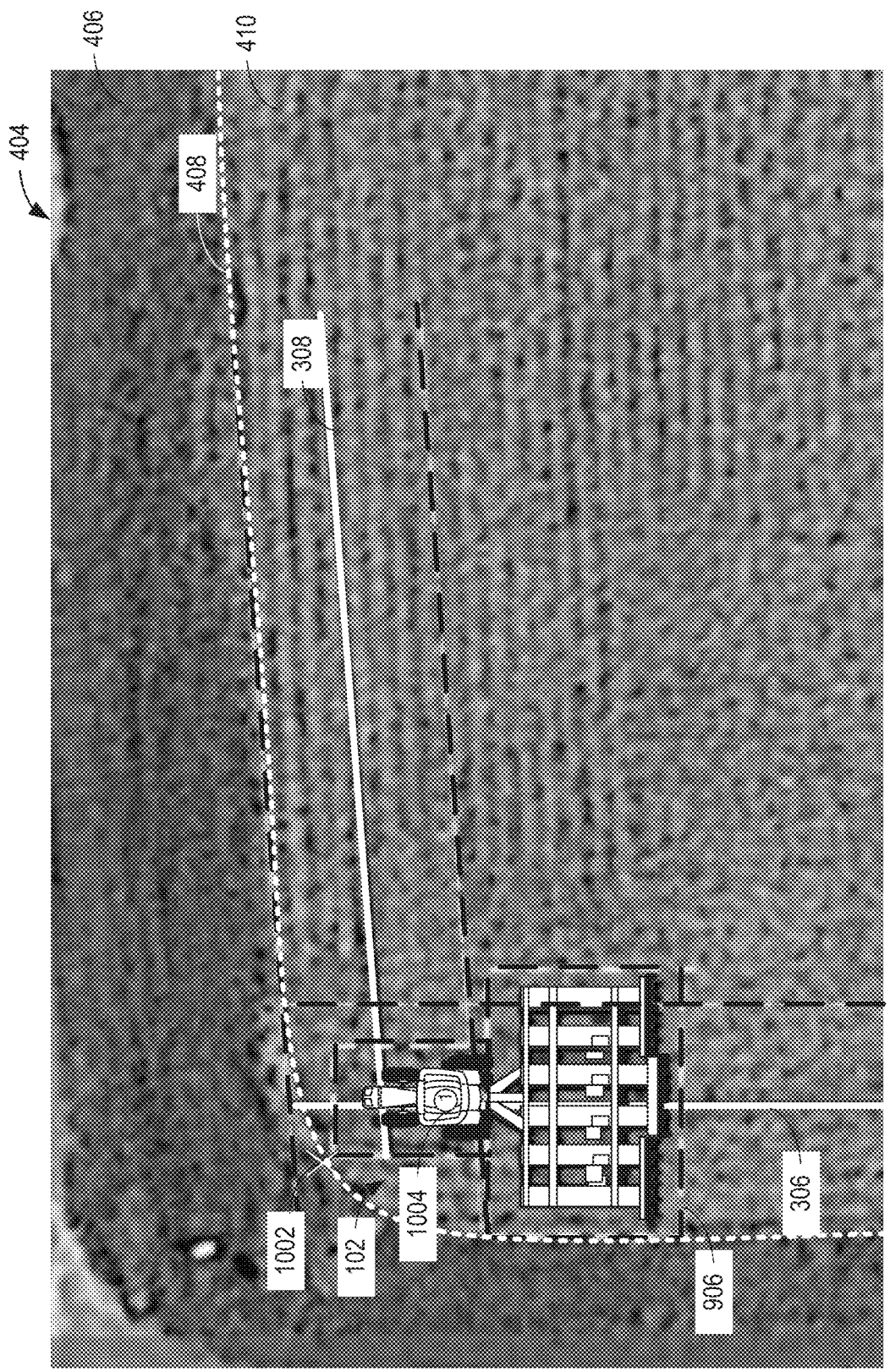
FIG. 10 illustrates a first example maneuver performed by the example vehicle of FIG. 9 travelling along the first example turn pattern of FIG. 4.

FIG. 10 illustrates a first example maneuver executed by the example vehicle 102 of FIG. 9 when travelling along the first example turn pattern 400 of FIG. 4. In the illustrated example of FIG. 10, during the first maneuver, the guidance control circuitry of FIG. 2 generates the navigation instructions 218 to steer the vehicle 102 forward along the first path section 306. In some examples, the input interface circuitry 202 of FIG. 2 periodically obtains GPS data from the GPS receiver 112 of FIG. 1 and provides the GPS data to the guidance control circuitry 210 of FIG. 2 for use in generating the navigation instructions 218.

In some examples, the guidance control circuitry 210 determines, based on the GPS data, whether the buffer zone 906 of the vehicle 102 crosses the interior boundary 408 of the headland region 406. In this example, in response to determining that the buffer zone 906 crosses the interior boundary 408 at an example first point 1002, the guidance control circuitry 210 causes the vehicle 102 to stop at a first example stop position 1004. In some examples, the guidance control circuitry 210 instructs, via the navigation instructions 218, the vehicle 102 to raise the implement 902 when the vehicle 102 is at the first stop position 1004.

Figure 11:
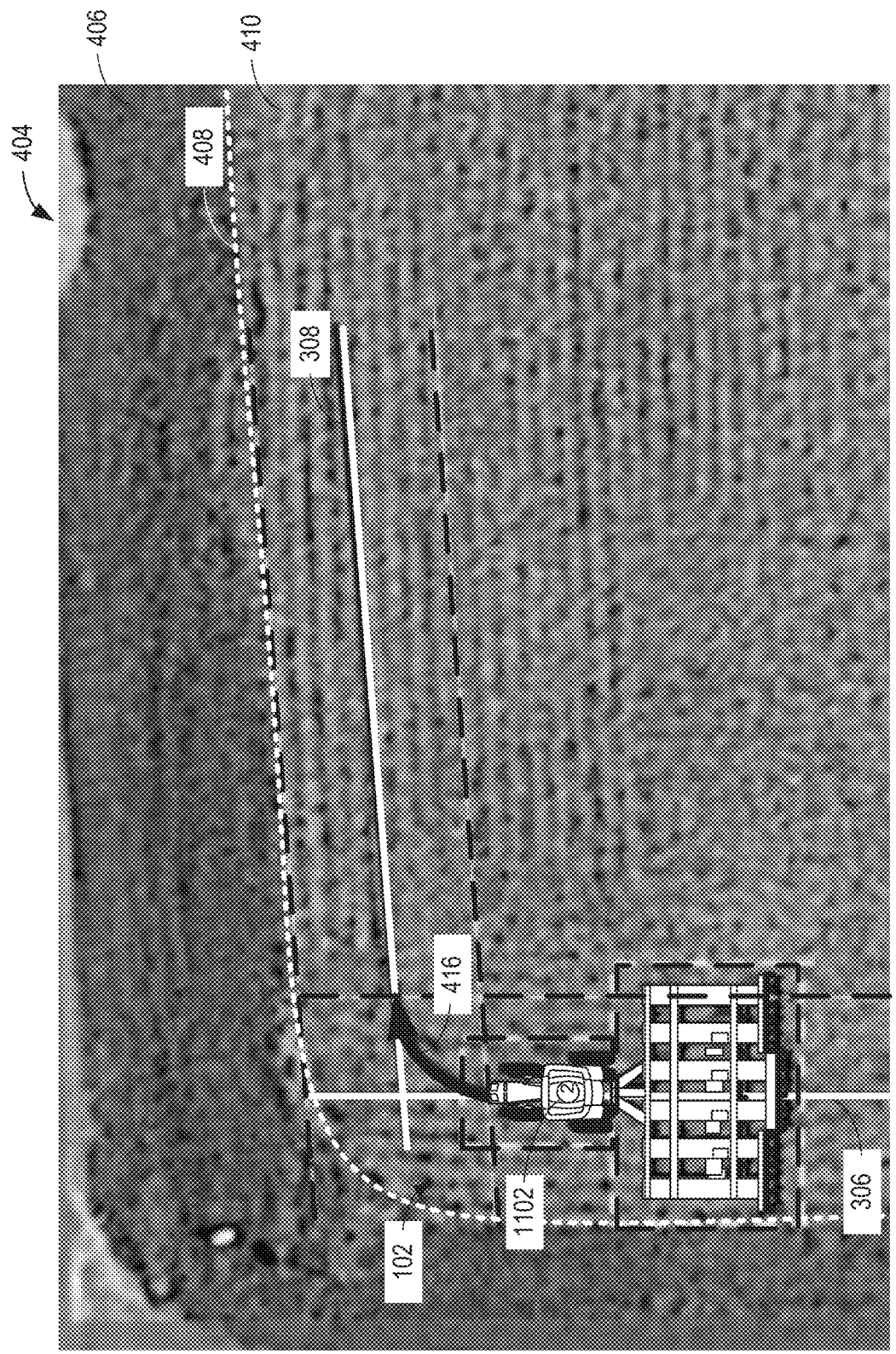
FIG. 11 illustrates a second example maneuver performed by the example vehicle of FIG. 9 travelling along the first example turn pattern of FIG. 4.

FIG. 11 illustrates a second example maneuver executed by the example vehicle 102 of FIG. 9 when travelling along the first example turn pattern 400 of FIG. 4. In some examples, the second maneuver of FIG. 11 is executed in response to the vehicle 102 completing the first maneuver of FIG. 10. In the illustrated example of FIG. 11, during the second maneuver, the guidance control circuitry 210 of FIG. 2 steers the vehicle 102 backward along the first path section 306. In some examples, the guidance control circuitry 210 determines, based on GPS data from the GPS receiver 112 of FIG. 1, whether the vehicle 102 is at a second example stop position 1102. In this example, the second stop position 1102 corresponds to a point at which the inner curved turn path 416 crosses the first path section 306. In this example, the guidance control circuitry 210 causes the vehicle 102 to stop at the second stop position 1102.

Figure 12:
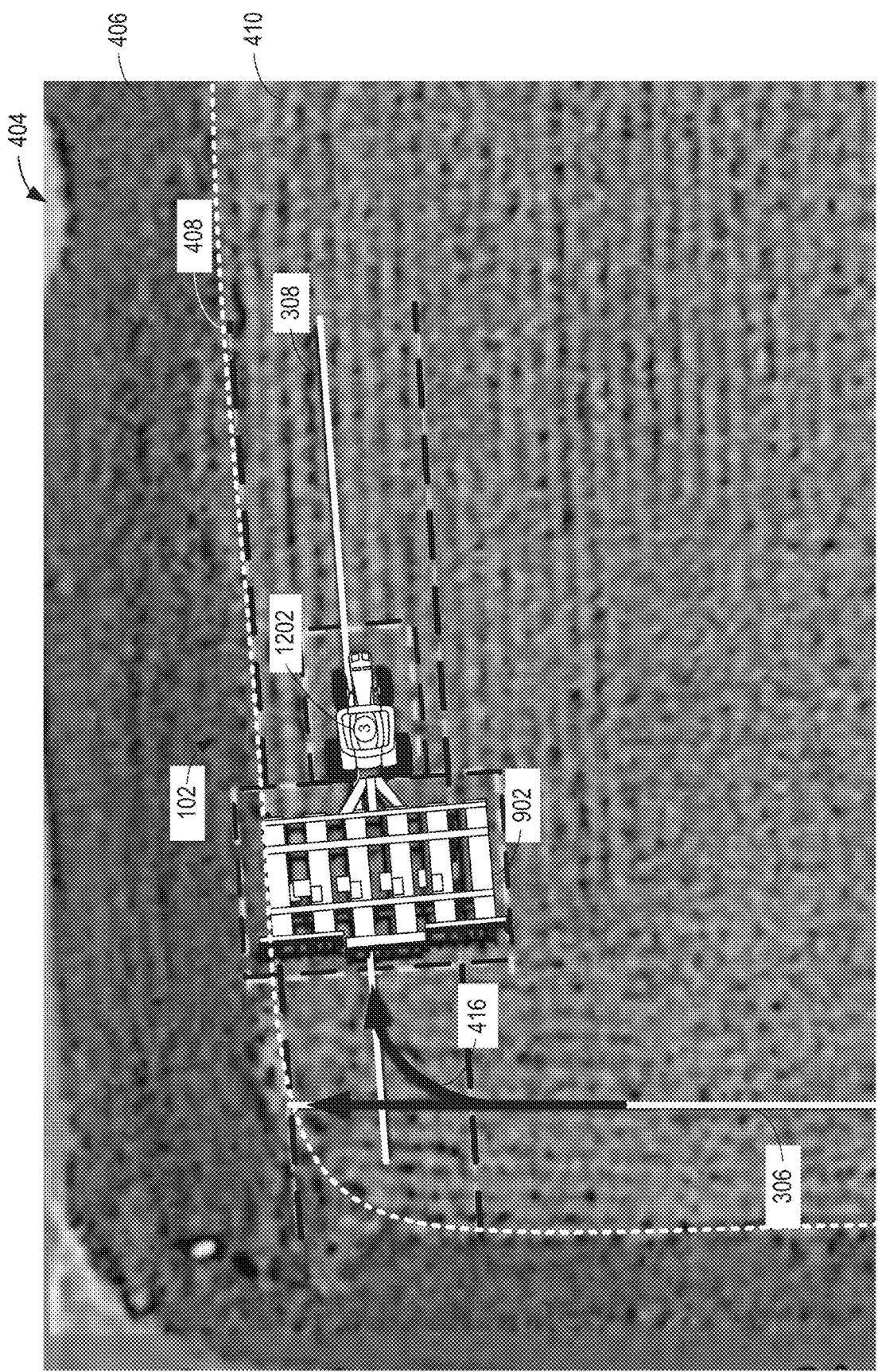
FIG. 12 illustrates a third example maneuver performed by the example vehicle of FIG. 9 travelling along the first example turn pattern of FIG. 4.

FIG. 12 illustrates a third example maneuver executed by the example vehicle 102 of FIG. 9 when travelling along the first example turn pattern 400 of FIG. 4. In some examples, the third maneuver of FIG. 12 is executed in response to the vehicle 102 completing the second maneuver of FIG. 11. In the illustrated example of FIG. 12, during the third maneuver, the guidance control circuitry 210 of FIG. 2 steers the vehicle 102 forward along the inner curved turn path 416 from the first path section 306 to the second path section 308.

In some examples, when the vehicle 102 reaches the second path section 308, the guidance control circuitry 210 steers the vehicle 102 forward along the second path section 308 until the implement 902 and the vehicle 102 are substantially aligned. In some examples, the guidance control circuitry 210 obtains, from the implement sensor 908 of FIG. 9, angular position data associated with the implement 902 and determines whether the implement 902 and the vehicle 102 are substantially aligned (e.g., within 5 degrees) based on the angular position data. In the illustrated example of FIG. 12, the vehicle 102 and the implement 902 are substantially aligned when the vehicle 102 is at an example third stop position 1202. As such, the guidance control circuitry 210 causes the vehicle 102 to stop at the third stop position 1202.

Figure 13:
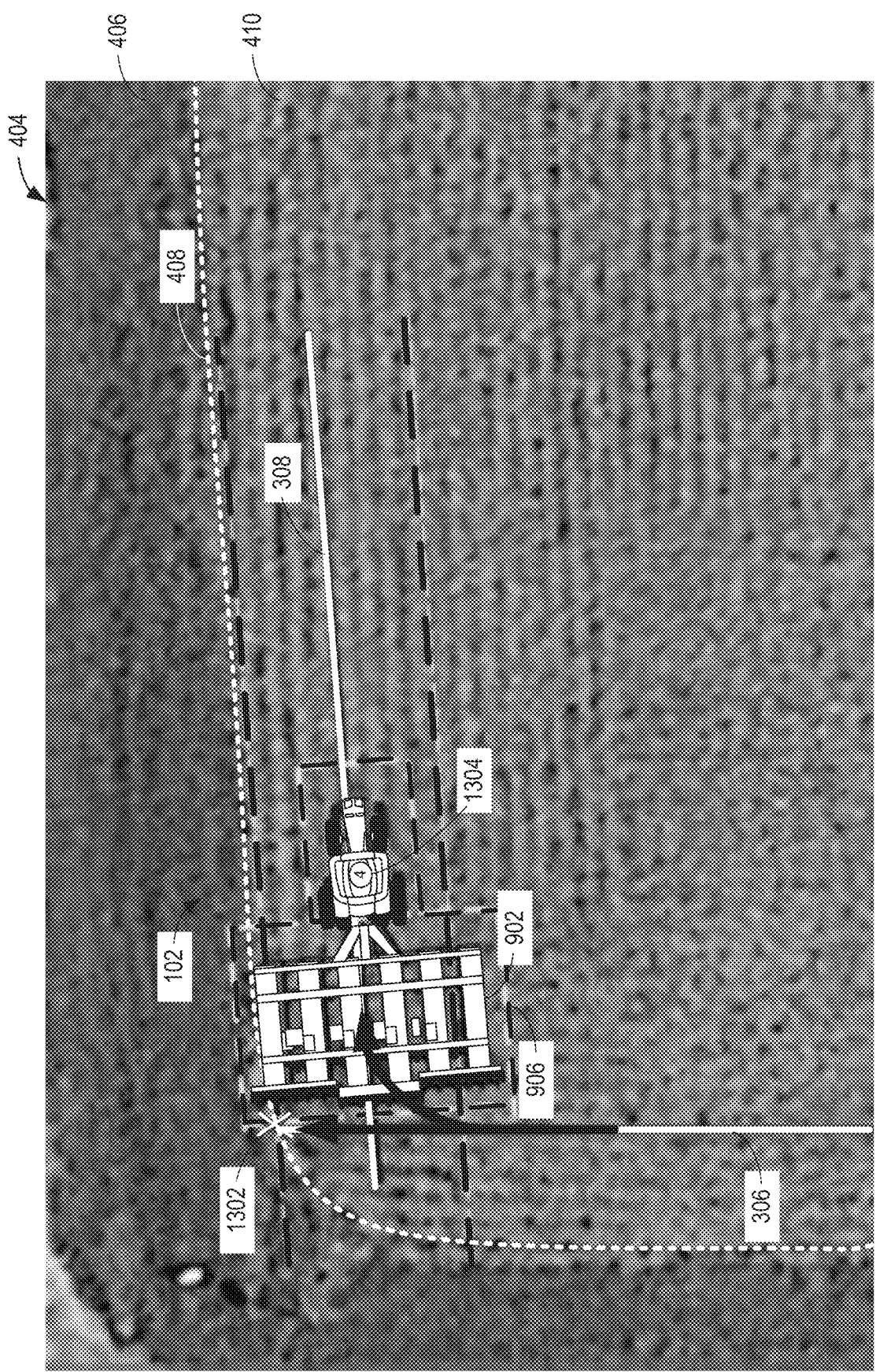
FIG. 13 illustrates a fourth example maneuver performed by the example vehicle of FIG. 9 travelling along the first example turn pattern of FIG. 4.

FIG. 13 illustrates a fourth example maneuver executed by the example vehicle 102 of FIG. 9 when travelling along the first example turn pattern 400 of FIG. 4. In some examples, the fourth maneuver of FIG. 13 is executed in response to the vehicle 102 completing the third maneuver of FIG. 12. In the illustrated example of FIG. 13, during the fourth maneuver, the guidance control circuitry 210 of FIG. 2 steers the vehicle 102 backward along the second path section 308.

In some examples, the guidance control circuitry 210 determines, based on GPS data from the GPS receiver 112 of FIG. 1, whether the buffer zone 906 of the vehicle 102 and/or the implement 902 crosses the interior boundary 408 of the headland region 406. In this example, in response to determining that the buffer zone 906 crosses the interior boundary 408 at an example second point 1302, the guidance control circuitry 210 causes the vehicle 102 to stop at a fourth example stop position 1304. In some examples, the guidance control circuitry 210 instructs the vehicle 102, via the navigation instructions 218, to lower the implement 902 when the vehicle 102 is at the fourth stop position 1304. In some examples, in response to the vehicle 102 completing the fourth maneuver of FIG. 13, the guidance control circuitry 210 steers the vehicle 102 forward along the second path section 308 and enables the vehicle 102 to continue traversing the guidance path 300 of FIG. 3.

Figure 14:
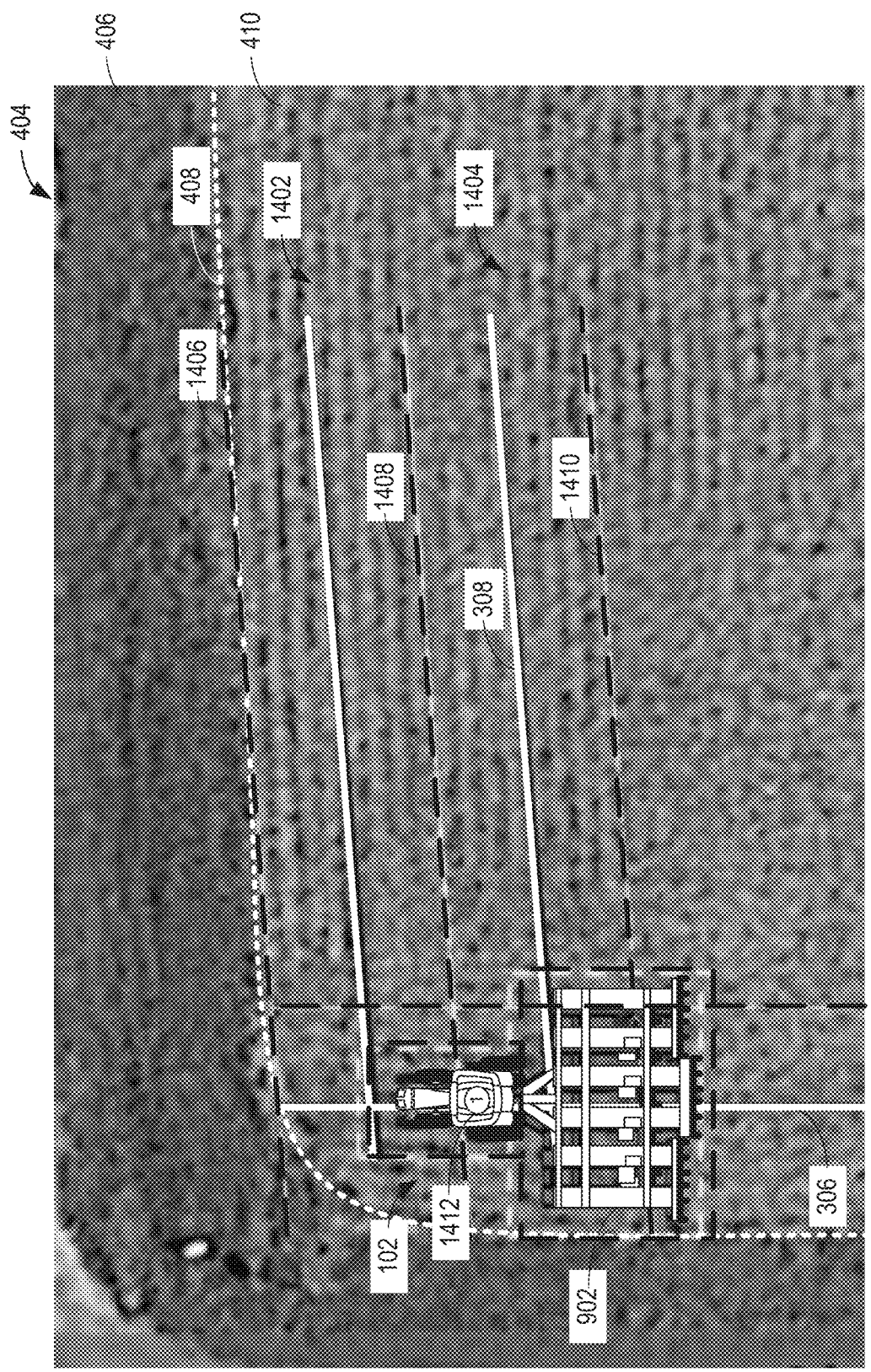
FIG. 14 illustrates an example alternative first maneuver performed by the example vehicle of FIG. 9 travelling along the first example turn pattern of FIG. 4.

FIG. 14 illustrates an alternative first example maneuver executed by the example vehicle 102 of FIG. 9 when travelling along the first example turn pattern 400 of FIG. 4. In some examples, the vehicle 102 executes the alternative first maneuver of FIG. 14 instead of the first maneuver of FIG. 10. For example, the vehicle 102 executes the alternative first maneuver when the vehicle control circuitry 104 is configured to reduce gaps in coverage of the field 404 by the implement 902. In the illustrated example of FIG. 14, a first example area 1402 is covered by the implement 902 during a first pass in the field 404, and an example second area 1404 is to be covered by the vehicle 102 in a second pass. In this example, the first area 1402 is defined by a first example boundary 1406 and a second example boundary 1408, and the second area 1404 is defined by the second boundary 1408 and a third example boundary 1410. In the illustrated example of FIG. 14, the guidance control circuitry 210 determines that the vehicle 102 is at an example fifth stop position 1412 when the vehicle 102 is at the second boundary 1408 between the first area 1402 and the second area 1404. In some examples, the guidance control circuitry 210 causes the vehicle 102 to stop at the fifth stop position 1412, and causes the vehicle 102 to execute the second, third, and fourth maneuvers of FIGS. 11, 12, and 13, respectively, from the fifth stop position 1412. In some examples, by causing the vehicle 102 to stop at the fifth stop position 1412 of FIG. 14, the guidance control circuitry 210 reduces overlapping of coverage during the first and second passes in the field 404.

While an example manner of implementing the vehicle control circuitry 104 of FIG. 1 is illustrated in FIG. 2, one or more of the elements, processes, and/or devices illustrated in FIG. 2 may be combined, divided, re-arranged, omitted, eliminated, and/or implemented in any other way. Further, the example input interface circuitry 202, the example turn identification circuitry 204, the example turn pattern selection circuitry 206, the example condition determination circuitry 208, the example guidance control circuitry 210, the example turn path generation circuitry 211, the example path database circuitry 212, and/or, more generally, the example vehicle control circuitry 104 of FIG. 2, may be implemented by hardware, software, firmware, and/or any combination of hardware, software, and/or firmware. Thus, for example, any of the example input interface circuitry 202, the example turn identification circuitry 204, the example turn pattern selection circuitry 206, the example condition determination circuitry 208, the example guidance control circuitry 210, the example turn path generation circuitry 211, the example path database circuitry 212, and/or, more generally, the example vehicle control circuitry 104, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC (s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example input interface circuitry 202, the example turn identification circuitry 204, the example turn pattern selection circuitry 206, the example condition determination circuitry 208, the example guidance control circuitry 210, the example turn path generation circuitry 211, and/or the example path database circuitry 212 is/are hereby expressly defined to include a non-transitory computer readable storage device or storage disk such as a memory, a digital versatile disk (DVD), a compact disk (CD), a Blu-ray disk, etc., including the software and/or firmware. Further still, the example vehicle control circuitry 104 of FIG. 1 may include one or more elements, processes, and/or devices in addition to, or instead of, those illustrated in FIG. 2, and/or may include more than one of any or all of the illustrated elements, processes and devices.

Figure 15:
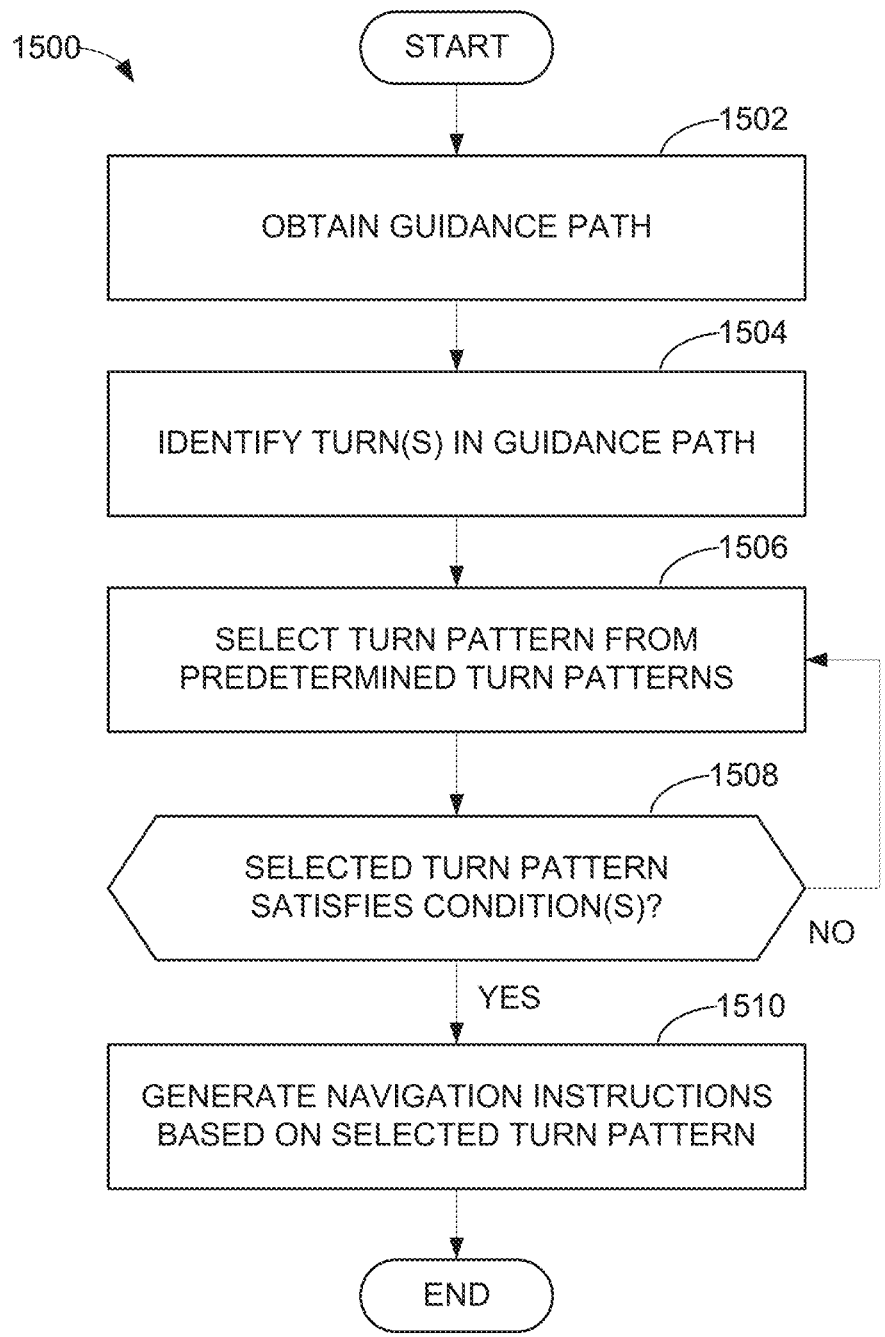
FIG. 15 is a flowchart representative of example machine readable instructions that may be executed by example processor circuitry to implement the example vehicle control circuitry of FIG. 2.

A flowchart representative of example hardware logic circuitry, machine readable instructions, hardware implemented state machines, and/or any combination thereof for implementing the vehicle control circuitry 104 of FIG. 2 is shown in FIG. 15. The machine readable instructions may be one or more executable programs or portion(s) of an executable program for execution by processor circuitry, such as the processor circuitry 1612 shown in the example processor platform 1600 discussed below in connection with FIG. 16 and/or the example processor circuitry discussed below in connection with FIGS. 17 and/or 18. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 15, many other methods of implementing the example vehicle control circuitry 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 15 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 15 is a flowchart representative of example machine readable instructions and/or example operations 1500 that may be executed and/or instantiated by processor circuitry to select a turn pattern for the example vehicle 102 of FIG. 1. The machine readable instructions and/or operations 1500 of FIG. 15 begin at block 1502, at which the example vehicle control circuitry 104 of FIG. 2 obtains a guidance path. For example, the example input interface circuitry 202 of FIG. 2 obtains the example guidance path 300 of FIG. 3 from the example path database circuitry 212 of FIG. 2 and/or from the example user interface 114 of FIG. 1. In some examples, the guidance path 300 is preloaded in the path database circuitry 212 and/or is selected via the user interface 114 by an operator of the vehicle 102.

At block 1504, the example vehicle control circuitry 104 identifies one or more turns (e.g., sharp turns) in the guidance path 300. For example, the example turn identification circuitry 204 of FIG. 2 identifies the turns 302A, 302B, 302C, 302D of FIG. 3 by identifying locations in the guidance path 300 at which a turn radius of the guidance path 300 is less than a threshold turn radius of the vehicle 102 and/or the implement 902.

At block 1506, the example vehicle control circuitry 104 selects a turn pattern from one or more predetermined turn pattern stored in the path database circuitry 212. For example, the example turn pattern selection circuitry 206 of FIG. 2 selects the turn path from the first turn pattern 400 of FIG. 4, the second turn pattern 500 of FIG. 5, the third turn pattern 600 of FIG. 6, the fourth turn pattern 700 of FIG. 7, and/or the fifth turn pattern 800 of FIG. 8. In some examples, the turn pattern selection circuitry 206 selects the turn path based on a predetermined sequence of the one or more predetermined turn paths. In some examples, the example turn path generation circuitry 211 generates one or more turn paths corresponding to the selected turn pattern.

At block 1508, the example vehicle control circuitry 104 determines whether the selected turn pattern satisfies one or more conditions. For example, the example condition determination circuitry 208 determines whether the selected turn pattern satisfies the one or more conditions based on whether at least one of the turn paths of the selected turn pattern overlaps the headland region 406 of FIG. 4. In response to the condition determination circuitry 208 determining that the selected turn pattern satisfies the one or more conditions (e.g., block 1508 returns a result of YES), control proceeds to block 1510. Alternatively, in response to the condition determination circuitry 208 determining that the selected turn pattern does not satisfy the one or more conditions (e.g., block 1508 returns a result of NO), control returns to block 1506.

At block 1510, the example vehicle control circuitry 104 generates the example navigation instructions 218 of FIG. 2 based on the selected turn pattern. For example, the example guidance control circuitry 210 generates the navigation instructions 218 to steer the vehicle 102 along the selected turn pattern.

Figure 16:
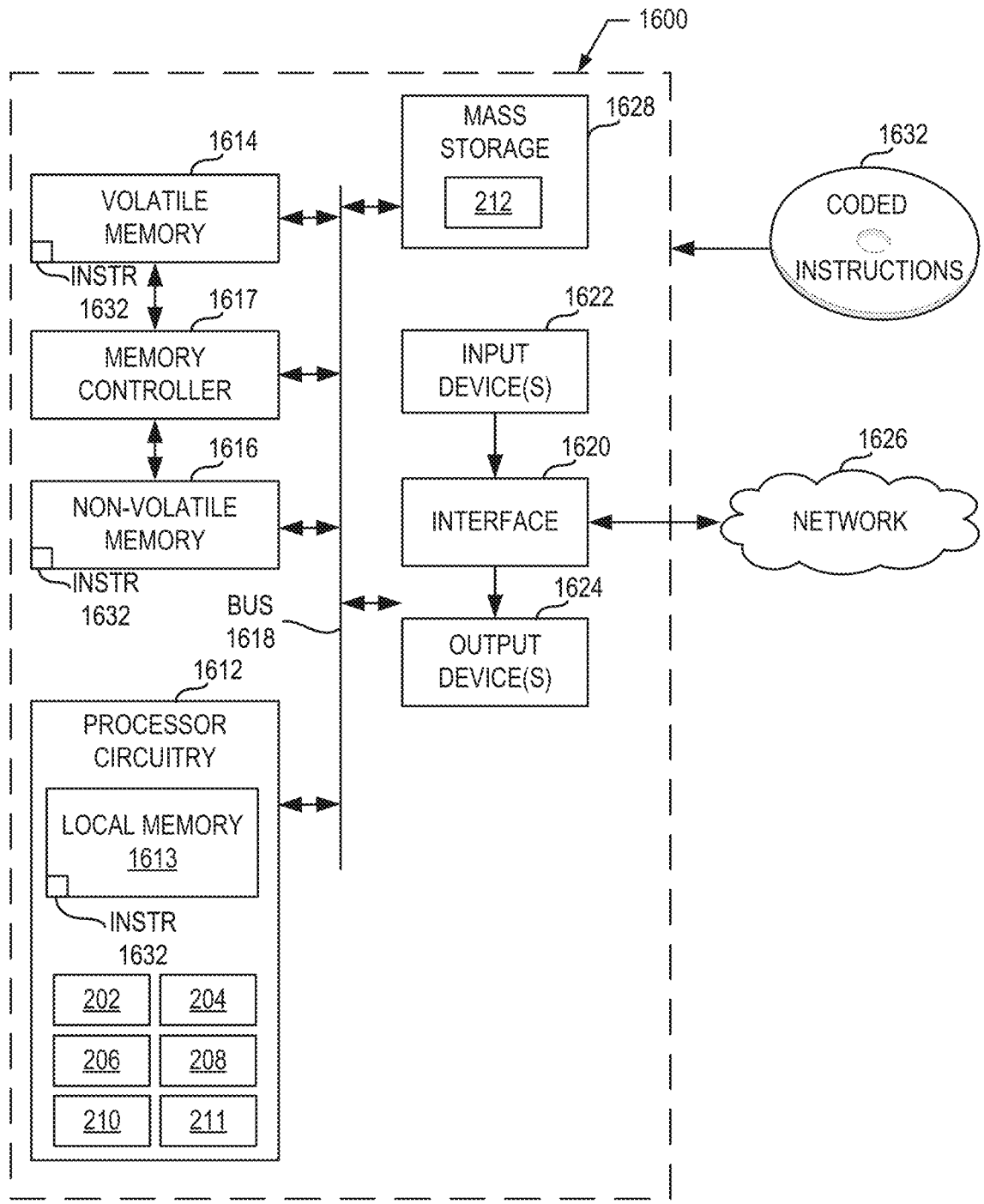
FIG. 16 is a block diagram of an example processing platform including processor circuitry structured to execute the example machine readable instructions of FIG. 15 to implement the example vehicle control circuitry of FIG. 2.

FIG. 16 is a block diagram of an example processor platform 1600 structured to execute and/or instantiate the machine readable instructions and/or operations of FIG. 15 to implement the vehicle control circuitry 104 of FIG. 2. The processor platform 1600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1600 of the illustrated example includes processor circuitry 1612. The processor circuitry 1612 of the illustrated example is hardware. For example, the processor circuitry 1612 can be implemented by one or more integrated circuits, logic circuits, FPGAs microprocessors, CPUs, GPUs, DSPs, and/or microcontrollers from any desired family or manufacturer. The processor circuitry 1612 may be implemented by one or more semiconductor based (e.g., silicon based) devices. In this example, the processor circuitry 1612 implements the example input interface circuitry 202, the example turn identification circuitry 204, the example turn pattern selection circuitry 206, the example condition determination circuitry 208, the example guidance control circuitry 210, and the example turn path generation circuitry 211.

The processor circuitry 1612 of the illustrated example includes a local memory 1613 (e.g., a cache, registers, etc.). The processor circuitry 1612 of the illustrated example is in communication with a main memory including a volatile memory 1614 and a non-volatile memory 1616 by a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1616 may be implemented by flash memory and/or any other desired type of memory device. Access to the main memory 1614, 1616 of the illustrated example is controlled by a memory controller 1617.

The processor platform 1600 of the illustrated example also includes interface circuitry 1620. The interface circuitry 1620 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1622 are connected to the interface circuitry 1620. The input device(s) 1622 permit(s) a user to enter data and/or commands into the processor circuitry 1612. The input device(s) 1622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1624 are also connected to the interface circuitry 1620 of the illustrated example. The output devices 1624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1620 of the illustrated example, thus, typically includes a graphics driver card, a graphics driver chip, and/or graphics processor circuitry such as a GPU.

The interface circuitry 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1600 of the illustrated example also includes one or more mass storage devices 1628 to store software and/or data. Examples of such mass storage devices 1628 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1632, which may be implemented by the machine readable instructions of FIG. 15, may be stored in the mass storage device 1628, in the volatile memory 1614, in the non-volatile memory 1616, and/or on a removable non-transitory computer readable storage medium such as a CD or DVD.

Figure 17:
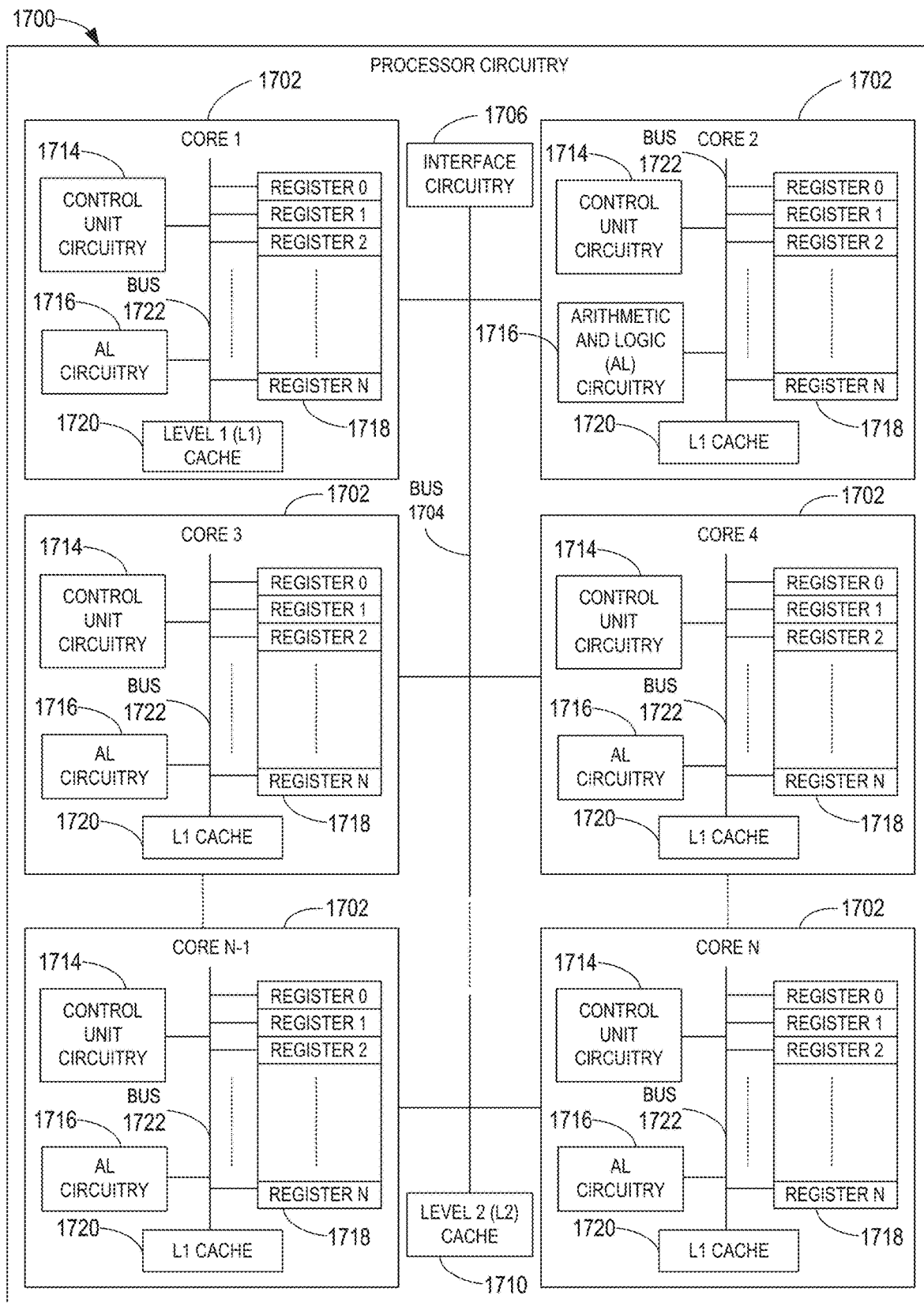
FIG. 17 is a block diagram of an example implementation of the processor circuitry of FIG. 16.

FIG. 17 is a block diagram of an example implementation of the processor circuitry 1612 of FIG. 16. In this example, the processor circuitry 1612 of FIG. 16 is implemented by a microprocessor 1700. For example, the microprocessor 1700 may implement multi-core hardware circuitry such as a CPU, a DSP, a GPU, an XPU, etc. Although it may include any number of example cores 1702 (e.g., 1 core), the microprocessor 1700 of this example is a multi-core semiconductor device including N cores. The cores 1702 of the microprocessor 1700 may operate independently or may cooperate to execute machine readable instructions. For example, machine code corresponding to a firmware program, an embedded software program, or a software program may be executed by one of the cores 1702 or may be executed by multiple ones of the cores 1702 at the same or different times. In some examples, the machine code corresponding to the firmware program, the embedded software program, or the software program is split into threads and executed in parallel by two or more of the cores 1702. The software program may correspond to a portion or all of the machine readable instructions and/or operations represented by the flowchart of FIG. 15.

The cores 1702 may communicate by an example bus 1704. In some examples, the bus 1704 may implement a communication bus to effectuate communication associated with one(s) of the cores 1702. For example, the bus 1704 may implement at least one of an Inter-Integrated Circuit (I2C) bus, a Serial Peripheral Interface (SPI) bus, a PCI bus, or a PCIe bus. Additionally or alternatively, the bus 1704 may implement any other type of computing or electrical bus. The cores 1702 may obtain data, instructions, and/or signals from one or more external devices by example interface circuitry 1706. The cores 1702 may output data, instructions, and/or signals to the one or more external devices by the interface circuitry 1706. Although the cores 1702 of this example include example local memory 1720 (e.g., Level 1 (L1) cache that may be split into an L1 data cache and an L1 instruction cache), the microprocessor 1700 also includes example shared memory 1710 that may be shared by the cores (e.g., Level 2 (L2_ cache)) for high-speed access to data and/or instructions. Data and/or instructions may be transferred (e.g., shared) by writing to and/or reading from the shared memory 1710. The local memory 1720 of each of the cores 1702 and the shared memory 1710 may be part of a hierarchy of storage devices including multiple levels of cache memory and the main memory (e.g., the main memory 1614, 1616 of FIG. 16). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1702 may be referred to as a CPU, DSP, GPU, etc., or any other type of hardware circuitry. Each core 1702 includes control unit circuitry 1714, arithmetic and logic (AL) circuitry (sometimes referred to as an ALU) 1716, a plurality of registers 1718, the L1 cache 1720, and an example bus 1722. Other structures may be present. For example, each core 1702 may include vector unit circuitry, single instruction multiple data (SIMD) unit circuitry, load/store unit (LSU) circuitry, branch/jump unit circuitry, floating-point unit (FPU) circuitry, etc. The control unit circuitry 1714 includes semiconductor-based circuits structured to control (e.g., coordinate) data movement within the corresponding core 1702. The AL circuitry 1716 includes semiconductor-based circuits structured to perform one or more mathematic and/or logic operations on the data within the corresponding core 1702. The AL circuitry 1716 of some examples performs integer based operations. In other examples, the AL circuitry 1716 also performs floating point operations. In yet other examples, the AL circuitry 1716 may include first AL circuitry that performs integer based operations and second AL circuitry that performs floating point operations. In some examples, the AL circuitry 1716 may be referred to as an Arithmetic Logic Unit (ALU). The registers 1718 are semiconductor-based structures to store data and/or instructions such as results of one or more of the operations performed by the AL circuitry 1716 of the corresponding core 1702. For example, the registers 1718 may include vector register(s), SIMD register(s), general purpose register(s), flag register(s), segment register(s), machine specific register(s), instruction pointer register(s), control register(s), debug register(s), memory management register(s), machine check register(s), etc. The registers 1718 may be arranged in a bank as shown in FIG. 17. Alternatively, the registers 1718 may be organized in any other arrangement, format, or structure including distributed throughout the core 1702 to shorten access time. The bus 1720 may implement at least one of an I2C bus, a SPI bus, a PCI bus, or a PCIe bus Each core 1702 and/or, more generally, the microprocessor 1700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 18:
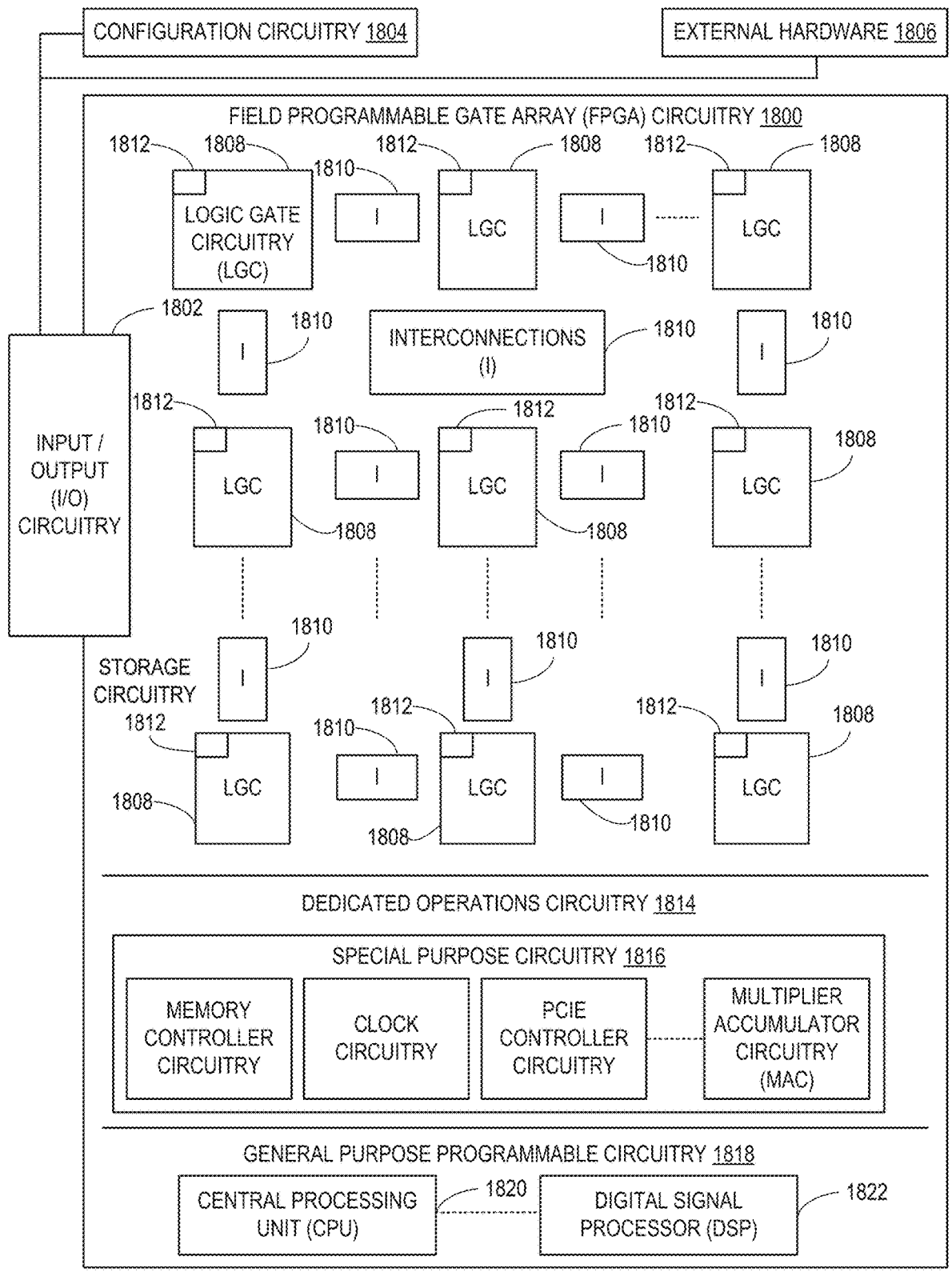
FIG. 18 is a block diagram of another example implementation of the processor circuitry of FIG. 16.

FIG. 18 is a block diagram of another example implementation of the processor circuitry 1612 of FIG. 16. In this example, the processor circuitry 1612 is implemented by FPGA circuitry 1800. The FPGA circuitry 1800 can be used, for example, to perform operations that could otherwise be performed by the example microprocessor 1700 of FIG. 17 executing corresponding machine readable instructions. However, once configured, the FPGA circuitry 1800 instantiates the machine readable instructions in hardware and, thus, can often execute the operations faster than they could be performed by a general purpose microprocessor executing the corresponding software.

More specifically, in contrast to the microprocessor 1700 of FIG. 17 described above (which is a general purpose device that may be programmed to execute some or all of the machine readable instructions represented by the flowchart of FIG. 15 but whose interconnections and logic circuitry are fixed once fabricated), the FPGA circuitry 1800 of the example of FIG. 18 includes interconnections and logic circuitry that may be configured and/or interconnected in different ways after fabrication to instantiate, for example, some or all of the machine readable instructions represented by the flowchart of FIG. 15. In particular, the FPGA 1800 may be thought of as an array of logic gates, interconnections, and switches. The switches can be programmed to change how the logic gates are interconnected by the interconnections, effectively forming one or more dedicated logic circuits (unless and until the FPGA circuitry 1800 is reprogrammed). The configured logic circuits enable the logic gates to cooperate in different ways to perform different operations on data received by input circuitry. Those operations may correspond to some or all of the software represented by the flowchart of FIG. 15. As such, the FPGA circuitry 1800 may be structured to effectively instantiate some or all of the machine readable instructions of the flowchart of FIG. 15 as dedicated logic circuits to perform the operations corresponding to those software instructions in a dedicated manner analogous to an ASIC. Therefore, the FPGA circuitry 1800 may perform the operations corresponding to the some or all of the machine readable instructions of FIG. 15 faster than the general purpose microprocessor can execute the same.

In the example of FIG. 18, the FPGA circuitry 1800 is structured to be programmed (and/or reprogrammed one or more times) by an end user by a hardware description language (HDL) such as Verilog. The FPGA circuitry 1800 of FIG. 18, includes example input/output (I/O) circuitry 1802 to obtain and/or output data to/from example configuration circuitry 1804 and/or external hardware (e.g., external hardware circuitry) 1806. For example, the configuration circuitry 1804 may implement interface circuitry that may obtain machine readable instructions to configure the FPGA circuitry 1800, or portion(s) thereof. In some such examples, the configuration circuitry 1804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1806 may implement the microprocessor 1700 of FIG. 17. The FPGA circuitry 1800 also includes an array of example logic gate circuitry 1808, a plurality of example configurable interconnections 1810, and example storage circuitry 1812. The logic gate circuitry 1808 and interconnections 1810 are configurable to instantiate one or more operations that may correspond to at least some of the machine readable instructions of FIG. 18 and/or other desired operations. The logic gate circuitry 1808 shown in FIG. 18 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1808 to enable configuration of the electrical structures and/or the logic gates to form circuits to perform desired operations. The logic gate circuitry 1808 may include other electrical structures such as look-up tables (LUTs), registers (e.g., flip-flops or latches), multiplexers, etc.

The interconnections 1810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1808 to program desired logic circuits.

The storage circuitry 1812 of the illustrated example is structured to store result(s) of the one or more of the operations performed by corresponding logic gates. The storage circuitry 1812 may be implemented by registers or the like. In the illustrated example, the storage circuitry 1812 is distributed amongst the logic gate circuitry 1808 to facilitate access and increase execution speed.

The example FPGA circuitry 1800 of FIG. 18 also includes example Dedicated Operations Circuitry 1814. In this example, the Dedicated Operations Circuitry 1814 includes special purpose circuitry 1816 that may be invoked to implement commonly used functions to avoid the need to program those functions in the field. Examples of such special purpose circuitry 1816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1800 may also include example general purpose programmable circuitry 1818 such as an example CPU 1820 and/or an example DSP 1822. Other general purpose programmable circuitry 1818 may additionally or alternatively be present such as a GPU, an XPU, etc., that can be programmed to perform other operations.

Although FIGS. 17 and 18 illustrate two example implementations of the processor circuitry 1612 of FIG. 16, many other approaches are contemplated. For example, as mentioned above, modern FPGA circuitry may include an on-board CPU, such as one or more of the example CPU 1820 of FIG. 18. Therefore, the processor circuitry 1612 of FIG. 16 may additionally be implemented by combining the example microprocessor 1700 of FIG. 17 and the example FPGA circuitry 1800 of FIG. 18. In some such hybrid examples, a first portion of the machine readable instructions represented by the flowchart of FIG. 15 may be executed by one or more of the cores 1702 of FIG. 17 and a second portion of the machine readable instructions represented by the flowchart of FIG. 15 may be executed by the FPGA circuitry 1800 of FIG. 18.

In some examples, the processor circuitry 1612 of FIG. 16 may be in one or more packages. For example, the processor circuitry 1700 of FIG. 17 and/or the FPGA circuitry 1800 of FIG. 18 may be in one or more packages. In some examples, an XPU may be implemented by the processor circuitry 1612 of FIG. 16, which may be in one or more packages. For example, the XPU may include a CPU in one package, a DSP in another package, a GPU in yet another package, and an FPGA in still yet another package.

Figure 19:
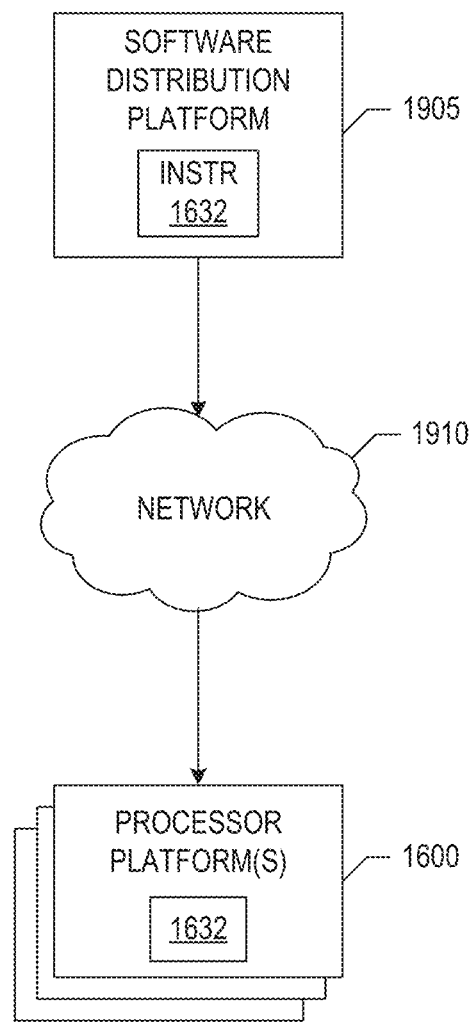
FIG. 19 is a block diagram of an example software distribution platform (e.g., one or more servers) to distribute software (e.g., software corresponding to the example machine readable instructions of FIG. 15) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1905 to distribute software such as the example machine readable instructions 1632 of FIG. 16 to hardware devices owned and/or operated by third parties is illustrated in FIG. 19. The example software distribution platform 1905 may be implemented by any computer server, data facility, cloud service, etc., capable of storing and transmitting software to other computing devices. The third parties may be customers of the entity owning and/or operating the software distribution platform 1905. For example, the entity that owns and/or operates the software distribution platform 1905 may be a developer, a seller, and/or a licensor of software such as the example machine readable instructions 1632 of FIG. 16. The third parties may be consumers, users, retailers, OEMs, etc., who purchase and/or license the software for use and/or re-sale and/or sub-licensing. In the illustrated example, the software distribution platform 1905 includes one or more servers and one or more storage devices. The storage devices store the machine readable instructions 1632, which may correspond to the example machine readable instructions 1500 of FIG. 15, as described above. The one or more servers of the example software distribution platform 1905 are in communication with a network 1910, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1632 from the software distribution platform 1905. For example, the software, which may correspond to the example machine readable instructions 1500 of FIG. 15, may be downloaded to the example processor platform 1600, which is to execute the machine readable instructions 1632 to implement the vehicle control circuitry 104. In some example, one or more servers of the software distribution platform 1905 periodically offer, transmit, and/or force updates to the software (e.g., the example machine readable instructions 1632 of FIG. 16) to ensure improvements, patches, updates, etc., are distributed and applied to the software at the end user devices.

From the foregoing, it will be appreciated that example systems, methods, apparatus, and articles of manufacture have been disclosed that select turn paths for a vehicle from one or more predetermined turn paths. Examples disclosed herein select the turn paths that satisfy a threshold turn radius of the vehicle and reduce gaps in coverage of a field. Advantageously, examples disclosed herein enable automated selection and/or tracking of the 0 turn paths without requiring input from an operator, thus improving efficiency of operation of the vehicle. The disclosed systems, methods, apparatus, and articles of manufacture are accordingly directed to one or more improvement(s) in the operation of a machine such as a computer or other electronic and/or mechanical device.

Example 1 includes an apparatus including input interface circuitry to obtain a guidance path for a vehicle, turn identification circuitry to identify a turn in the guidance path, and turn pattern selection circuitry to select, from a plurality of predetermined turn patterns, a turn pattern for the turn, where the turn pattern satisfies a condition.

Example 2 includes the apparatus of Example 1, and further includes turn path generation circuitry to generate, based on the turn path, one or more paths of the turn pattern and locations at which an implement of the vehicle is raised or lowered.

Example 3 includes the apparatus of Example 2, where a first path of the one or more paths is in a forward direction of the vehicle and a second path of the one or more paths is in a reverse direction of the vehicle.

Example 4 includes the apparatus of Example 1, and further includes condition determination circuitry to determine whether the turn pattern satisfies the condition based on whether the vehicle is within a boundary of a headland region when the vehicle traverses the turn pattern.

Example 5 includes the apparatus of Example 1, where the turn identification circuitry is to identify the turn based on a first turn radius of the turn being less than a threshold turn radius of at least one of the vehicle or an implement of the vehicle.

Example 6 includes the apparatus of Example 1, where the turn pattern is a first turn pattern, the turn pattern selection circuitry is to select a second turn pattern from the plurality of predetermined turn patterns, determine a first coverage of the first turn pattern and a second coverage of the second turn pattern, and select one of the first turn pattern or the second turn pattern corresponding to a greater one of the first coverage or the second coverage.

Example 7 includes the apparatus of Example 1, where the turn pattern selection circuitry is to select the turn pattern based on user input from a user interface of the vehicle.

Example 8 includes a non-transitory computer readable medium including instructions that, when executed, cause at least one processor to at least obtain a guidance path for a vehicle, identify a turn in the guidance path, and select, from a plurality of predetermined turn patterns, a turn pattern for the turn, wherein the turn pattern satisfies a condition.

Example 9 includes the non-transitory computer readable medium of Example 8, where the instructions, when executed, cause the at least processor to generate, based on the turn path, one or more paths of the turn pattern and locations at which an implement of the vehicle is raised or lowered.

Example 10 includes the non-transitory computer readable medium of Example 9, where a first path of the one or more paths is in a forward direction of the vehicle and a second path of the one or more paths is in a reverse direction of the vehicle.

Example 11 includes the non-transitory computer readable medium of Example 8, where the instructions, when executed, cause the at least processor to determine whether the turn pattern satisfies the condition based on whether the vehicle is within a boundary of a headland region when the vehicle traverses the turn pattern.

Example 12 includes the non-transitory computer readable medium of Example 8, where the instructions, when executed, cause the at least processor to identify the turn based on a first turn radius of the turn being less than a threshold turn radius of at least one of the vehicle or an implement of the vehicle.

Example 13 includes the non-transitory computer readable medium of Example 8, where the turn pattern is a first turn pattern, the instructions, when executed, cause the at least processor to select a second turn pattern from the plurality of predetermined turn patterns, determine a first coverage of the first turn pattern and a second coverage of the second turn pattern, and select one of the first turn pattern or the second turn pattern corresponding to a greater one of the first coverage or the second coverage.

Example 14 includes the non-transitory computer readable medium of Example 8, where the instructions, when executed, cause the at least processor to select the turn pattern based on user input from a user interface of the vehicle.

Example 15 includes an apparatus including means for obtaining to obtain a guidance path for a vehicle, means for identifying to identify a turn in the guidance path, and means for selecting to select, from a plurality of predetermined turn patterns, a turn pattern for the turn, wherein the turn pattern satisfies a condition.

Example 16 includes the apparatus of Example 15, and further includes means for generating turn paths to generate, based on the turn pattern, one or more paths of the turn pattern and locations at which an implement of the vehicle is raised or lowered.

Example 17 includes the apparatus of Example 16, where a first path of the one or more paths is in a forward direction of the vehicle and a second path of the one or more paths is in a reverse direction of the vehicle.

Example 18 includes the apparatus of Example 15, and further includes means for determining to determine whether the turn pattern satisfies the condition based on whether the vehicle is within a boundary of a headland region when the vehicle traverses the turn pattern.

Example 19 includes the apparatus of Example 15, where the means for identifying is to identify the turn based on a first turn radius of the turn being less than a threshold turn radius of at least one of the vehicle or an implement of the vehicle.

Example 20 includes the apparatus of Example 15, where the turn pattern is a first turn pattern, the means for selecting is to select a second turn pattern from the plurality of predetermined turn patterns, determine a first coverage of the first turn pattern and a second coverage of the second turn pattern, and select one of the first turn pattern or the second turn pattern corresponding to a greater one of the first coverage or the second coverage.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   input interface circuitry to obtain a guidance path for a vehicle;
   turn identification circuitry to identify a turn in the guidance path;
   turn pattern selection circuitry to:
      identify, from first turn patterns from a plurality of predetermined turn patterns, second turn patterns that do not include a curved backup path; and
      select, from the second turn patterns, a turn pattern for the turn, wherein the turn pattern satisfies a condition; and
   guidance control circuitry to:
      detect an angular position of an implement relative to the vehicle, the implement coupled to the vehicle; and
      cause steering of the vehicle along the turn based on the turn pattern and the angular position.

2. The apparatus of claim 1, further including turn path generation circuitry to generate, based on the turn pattern, one or more paths of the turn pattern and locations at which the implement is raised or lowered.

3. The apparatus of claim 2, wherein a first path of the one or more paths is in a forward direction of the vehicle and a second path of the one or more paths is in a reverse direction of the vehicle.

4. The apparatus of claim 1, further including condition determination circuitry to determine whether the turn pattern satisfies the condition based on whether the vehicle is within a boundary of a headland region when the vehicle traverses the turn pattern.

5. The apparatus of claim 1, wherein the turn identification circuitry is to identify the turn based on a first turn radius of the turn being less than a threshold turn radius of at least one of the vehicle or the implement.

6. The apparatus of claim 1, wherein the turn pattern is a first candidate turn pattern, the turn pattern selection circuitry is to:
   select a second candidate turn pattern from the second turn patterns;
   determine a first coverage of the first candidate turn pattern and a second coverage of the second candidate turn pattern; and
   select one of the first candidate turn pattern or the second candidate turn pattern corresponding to a greater one of the first coverage or the second coverage.

7. The apparatus of claim 1, wherein the turn pattern selection circuitry is to select the turn pattern based on user input from a user interface of the vehicle.

8. A non-transitory computer readable medium comprising instructions that, when executed, cause at least one processor to at least:
   obtain a guidance path for a vehicle;
   identify a turn in the guidance path;
   identify, from first turn patterns from a plurality of predetermined turn patterns, second turn patterns that do not include a curved backup path;
   select, from the second turn patterns, a turn pattern for the turn, wherein the turn pattern satisfies a condition;
   detect an angular position of an implement relative to the vehicle, the implement coupled to the vehicle; and
   cause steering of the vehicle along the turn based on the turn pattern and the angular position.

9. The non-transitory computer readable medium of claim 8, wherein the instructions, when executed, cause the at least processor to generate, based on the turn pattern, one or more paths of the turn pattern and locations at which the implement is raised or lowered.

10. The non-transitory computer readable medium of claim 9, wherein a first path of the one or more paths is in a forward direction of the vehicle and a second path of the one or more paths is in a reverse direction of the vehicle.

11. The non-transitory computer readable medium of claim 8, wherein the instructions, when executed, cause the at least processor to determine whether the turn pattern satisfies the condition based on whether the vehicle is within a boundary of a headland region when the vehicle traverses the turn pattern.

12. The non-transitory computer readable medium of claim 8, wherein the instructions, when executed, cause the at least processor to identify the turn based on a first turn radius of the turn being less than a threshold turn radius at least one of the vehicle or the implement.

13. The non-transitory computer readable medium of claim 8, wherein the turn pattern is a first candidate turn pattern, the instructions, when executed, cause the at least processor to:
   select a second candidate turn pattern from the second turn patterns;
   determine a first coverage of the first candidate turn pattern and a second coverage of the second candidate turn pattern; and
   select one of the first candidate turn pattern or the second candidate turn pattern corresponding to a greater one of the first coverage or the second coverage.

14. The non-transitory computer readable medium of claim 8, wherein the instructions, when executed, cause the at least processor to select the turn pattern based on user input from a user interface of the vehicle.

15. An apparatus comprising:
   means for obtaining to obtain a guidance path for a vehicle;
   means for identifying to identify a turn in the guidance path;
   means for identifying, from first turn patterns from a plurality of predetermined turn patterns, second turn patterns that do not include a curved backup path;
   means for selecting to select, from the second turn patterns, a turn pattern for the turn, wherein the turn pattern satisfies a condition; and
   means for guiding to:
      detect an angular position of an implement relative to the vehicle, the implement coupled to the vehicle; and
      cause steering of the vehicle along the turn based on the turn pattern and the angular position.

16. The apparatus of claim 15, further including means for generating turn paths to generate, based on the turn pattern, the one or more paths of the turn pattern and locations at which the implement is raised or lowered.

17. The apparatus of claim 16, wherein a first path of the one or more paths is in a forward direction of the vehicle and a second path of the one or more paths is in a reverse direction of the vehicle.

18. The apparatus of claim 15, further including means for determining to determine whether the turn pattern satisfies the condition based on whether the vehicle is within a boundary of a headland region when the vehicle traverses the turn pattern.

19. The apparatus of claim 15, wherein the means for identifying is to identify the turn based on a first turn radius of the turn being less than a threshold turn radius of at least one of the vehicle or the implement.

20. The apparatus of claim 15, wherein the turn pattern is a first candidate turn pattern, the means for selecting is to:
- select a second candidate turn pattern from the second turn patterns;
- determine a first coverage of the first candidate turn pattern and a second coverage of the second candidate turn pattern; and
- select one of the first candidate turn pattern or the second candidate turn pattern corresponding to a greater one of the first coverage or the second coverage.

* * * * *